(12) United States Patent
Eisen

(10) Patent No.: US 12,430,651 B2
(45) Date of Patent: *Sep. 30, 2025

(54) SYSTEMS AND METHODS FOR ACCESSING RECORDS VIA DERIVATIVE LOCATORS

(71) Applicant: The 41st Parameter, Inc., Scottsdale, AZ (US)

(72) Inventor: Ori Eisen, Scottsdale, AZ (US)

(73) Assignee: The 41st Parameter, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/647,982

(22) Filed: Apr. 26, 2024

(65) Prior Publication Data
US 2024/0273539 A1    Aug. 15, 2024

Related U.S. Application Data

(63) Continuation of application No. 17/654,353, filed on Mar. 10, 2022, now Pat. No. 12,002,053, which is a
(Continued)

(51) Int. Cl.
*G06Q 40/12* (2023.01)
*G06F 16/23* (2019.01)
(Continued)

(52) U.S. Cl.
CPC ..... *G06Q 20/4016* (2013.01); *G06F 16/2322* (2019.01); *G06F 16/245* (2019.01);
(Continued)

(58) Field of Classification Search
CPC .... G06Q 20/4016; G06Q 40/02; G06Q 40/10; G06Q 40/12; G06F 16/2322; G06F 16/245
(Continued)

(56) References Cited

U.S. PATENT DOCUMENTS

| 4,801,924 A | 1/1989 | Burgmann et al. |
| 4,805,222 A | 2/1989 | Young et al. |

(Continued)

FOREIGN PATENT DOCUMENTS

| AU | 2022206815 | 8/2022 |
| EP | 0 418 144 | 3/1991 |

(Continued)

OTHER PUBLICATIONS

Banking Services Newsletter, "Keeping You Up-to-Date on Banking Developments Throughout the UC System", University of California, Office of the President, Banking Services Group, Newsletter 1, Dec. 2005, p. 1.

(Continued)

*Primary Examiner* — Garcia Ade
(74) *Attorney, Agent, or Firm* — Knobbe Martens Olson & Bear LLP

(57) ABSTRACT

Systems and methods are provided for accessing records using derivative locators. An open financial transaction may be initiated by a consumer at a merchant. The merchant may provide transaction information to the acquiring bank, which may provide transaction to the global financial network, which may provide transaction information to an issuing bank. One or more requesting party (e.g., one or more of the acquiring bank, global financial network, or issuing bank) may formulate a derivative locator based on the transaction information received. The derivative locator may function as an index through which records in the repository may be accessed by the requesting party. A time comparison may be made in assisting with accessing the correct record in the repository. The requesting party may determine whether to accept or decline the transaction, optionally with the aid of the information accessed from the repository.

19 Claims, 6 Drawing Sheets

Related U.S. Application Data continuation of application No. 16/532,228, filed on Aug. 5, 2019, now Pat. No. 11,301,860, which is a continuation of application No. 14/609,388, filed on Jan. 29, 2015, now Pat. No. 10,417,637, which is a continuation of application No. PCT/US2013/053495, filed on Aug. 2, 2013.

(60) Provisional application No. 61/728,713, filed on Nov. 20, 2012, provisional application No. 61/704,320, filed on Sep. 21, 2012, provisional application No. 61/679,048, filed on Aug. 2, 2012.

(51) Int. Cl.
  *G06F 16/245* (2019.01)
  *G06Q 20/40* (2012.01)
  *G06Q 40/02* (2023.01)
  *G06Q 40/10* (2023.01)

(52) U.S. Cl.
  CPC ............. *G06Q 40/02* (2013.01); *G06Q 40/10* (2013.01); *G06Q 40/12* (2013.12)

(58) Field of Classification Search
  USPC .......................................................... 705/30
  See application file for complete search history.

(56) References Cited

U.S. PATENT DOCUMENTS

| | | |
|---|---|---|
| 4,912,761 A | 3/1990 | Tan et al. |
| 4,924,387 A | 5/1990 | Jeppesen |
| 5,184,849 A | 2/1993 | Taylor |
| 5,491,735 A | 2/1996 | Hsieh |
| 5,519,827 A | 5/1996 | Mizushima |
| 5,521,907 A | 5/1996 | Ennis, Jr. |
| 5,557,686 A | 9/1996 | Brown et al. |
| 5,583,380 A | 12/1996 | Larsen et al. |
| 5,627,886 A | 5/1997 | Bowman |
| 5,679,940 A | 10/1997 | Templeton et al. |
| 5,721,765 A | 2/1998 | Smith |
| 5,724,424 A | 3/1998 | Gifford |
| 5,748,740 A | 5/1998 | Curry et al. |
| 5,748,780 A | 5/1998 | Stolfo et al. |
| 5,764,275 A | 6/1998 | Lappington et al. |
| 5,802,156 A | 9/1998 | Felger |
| 5,819,226 A | 10/1998 | Gopinathan et al. |
| 5,864,620 A | 1/1999 | Pettitt |
| 5,884,289 A | 3/1999 | Anderson et al. |
| 5,886,334 A | 3/1999 | D'Entremont |
| 5,892,900 A | 4/1999 | Ginter et al. |
| 5,894,510 A | 4/1999 | Felger |
| 5,899,980 A | 5/1999 | Wilf et al. |
| 5,903,646 A | 5/1999 | Rackman |
| 5,903,721 A | 5/1999 | Sixtus |
| 5,933,480 A | 8/1999 | Felger |
| 5,960,069 A | 9/1999 | Felger |
| 6,009,523 A | 12/1999 | Owaki et al. |
| 6,029,154 A | 2/2000 | Pettitt |
| 6,029,159 A | 2/2000 | Zorba et al. |
| 6,062,474 A | 5/2000 | Kroll |
| 6,078,907 A | 6/2000 | Lamm |
| 6,092,053 A | 7/2000 | Boesch et al. |
| 6,094,643 A | 7/2000 | Anderson et al. |
| 6,105,012 A | 8/2000 | Chang et al. |
| 6,112,240 A | 8/2000 | Pogue et al. |
| 6,148,407 A | 11/2000 | Aucsmith |
| 6,151,593 A | 11/2000 | Cho et al. |
| 6,163,604 A | 12/2000 | Baulier et al. |
| 6,163,771 A | 12/2000 | Walker et al. |
| 6,164,528 A | 12/2000 | Hills et al. |
| 6,205,436 B1 | 3/2001 | Rosen et al. |
| 6,209,104 B1 | 3/2001 | Jalili |
| 6,216,153 B1 | 4/2001 | Vortriede |
| 6,223,289 B1 | 4/2001 | Wall et al. |
| 6,282,276 B1 | 8/2001 | Felger |
| 6,295,605 B1 | 9/2001 | Dockter et al. |
| 6,327,384 B1 | 12/2001 | Hirao et al. |
| 6,330,546 B1 | 12/2001 | Gopinathan et al. |
| 6,370,648 B1 | 4/2002 | Diep |
| 6,405,922 B1 | 6/2002 | Kroll |
| 6,442,529 B1 | 8/2002 | Krishan et al. |
| 6,442,692 B1 | 8/2002 | Zilberman |
| 6,457,021 B1 | 9/2002 | Berkowitz et al. |
| 6,480,710 B1 | 11/2002 | Laybourn et al. |
| 6,509,847 B1 | 1/2003 | Anderson |
| 6,523,019 B1 | 2/2003 | Borthwick |
| 6,546,493 B1 | 4/2003 | Magdych et al. |
| 6,553,108 B1 | 4/2003 | Felger |
| 6,560,455 B2 | 5/2003 | Amin et al. |
| 6,567,099 B1 | 5/2003 | Dawson |
| 6,597,775 B2 | 7/2003 | Lawyer et al. |
| 6,646,765 B1 | 11/2003 | Barker et al. |
| 6,678,666 B1 | 1/2004 | Boulware |
| 6,687,390 B2 | 2/2004 | Avni et al. |
| 6,687,696 B2 | 2/2004 | Hofmann et al. |
| 6,689,055 B1 | 2/2004 | Mullen et al. |
| 6,718,363 B1 | 4/2004 | Ponte |
| 6,745,333 B1 | 6/2004 | Thomsen |
| 6,803,920 B2 | 10/2004 | Gossett et al. |
| 6,804,624 B2 | 10/2004 | Silverman |
| 6,850,606 B2 | 2/2005 | Lawyer et al. |
| 6,892,307 B1 | 5/2005 | Wood et al. |
| 6,895,507 B1 | 5/2005 | Tepler |
| 6,895,514 B1 | 5/2005 | Kermani |
| 6,898,709 B1 | 5/2005 | Teppler |
| 6,908,030 B2 | 6/2005 | Rajasekaran et al. |
| 6,937,569 B1 | 8/2005 | Sarkar et al. |
| 6,947,978 B2 | 9/2005 | Huffman |
| 6,954,532 B1 | 10/2005 | Handley et al. |
| 6,957,185 B1 | 10/2005 | Labaton |
| 6,957,339 B2 | 10/2005 | Shinzaki |
| 7,002,712 B2 | 2/2006 | Barker et al. |
| 7,003,670 B2 | 2/2006 | Heaven et al. |
| 7,007,174 B2 | 2/2006 | Wheeler et al. |
| 7,013,001 B1 | 3/2006 | Felger |
| 7,027,800 B2 | 4/2006 | Haumont et al. |
| 7,039,505 B1 | 5/2006 | Southard et al. |
| 7,039,699 B1 | 5/2006 | Narin et al. |
| 7,043,640 B2 | 5/2006 | Pritchard et al. |
| 7,089,310 B1 | 8/2006 | Ellerman et al. |
| 7,089,585 B1 | 8/2006 | Dharmarajan |
| 7,096,192 B1 | 8/2006 | Pettitt |
| 7,100,049 B2 | 8/2006 | Gasparini et al. |
| 7,103,570 B1 | 9/2006 | Morea et al. |
| 7,103,668 B1 | 9/2006 | Corley et al. |
| 7,120,590 B1 | 10/2006 | Eisen et al. |
| 7,130,858 B2 | 10/2006 | Ciaramitaro et al. |
| 7,143,095 B2 | 11/2006 | Barrett et al. |
| 7,158,622 B2 | 1/2007 | Lawyer et al. |
| 7,165,051 B2 | 1/2007 | Ronning et al. |
| 7,174,454 B2 | 2/2007 | Roskind |
| 7,191,467 B1 | 3/2007 | Dujari et al. |
| 7,197,646 B2 | 3/2007 | Fritz et al. |
| 7,206,938 B2 | 4/2007 | Bender et al. |
| 7,221,949 B2 | 5/2007 | Clough |
| 7,225,974 B2 | 6/2007 | Yamauchi |
| 7,237,717 B1 | 7/2007 | Rao et al. |
| 7,249,093 B1 | 7/2007 | King |
| 7,251,624 B1 | 7/2007 | Lee et al. |
| 7,260,837 B2 | 8/2007 | Abraham et al. |
| 7,263,492 B1 | 8/2007 | Suresh et al. |
| 7,263,506 B2 | 8/2007 | Lee et al. |
| 7,272,610 B2 | 9/2007 | Torres |
| 7,272,728 B2 | 9/2007 | Pierson et al. |
| 7,292,723 B2 | 11/2007 | Tedesco et al. |
| 7,293,096 B1 | 11/2007 | Foltak et al. |
| 7,296,088 B1 | 11/2007 | Padmanabhan et al. |
| 7,328,216 B2 | 2/2008 | Hofmann et al. |
| 7,330,824 B1 | 2/2008 | Kanojia et al. |
| 7,330,871 B2 | 2/2008 | Barber |
| 7,340,045 B2 | 3/2008 | Felger |
| 7,346,551 B2 | 3/2008 | Pe Jimenez et al. |
| 7,346,775 B2 | 3/2008 | Gasparinl et al. |

(56) References Cited

U.S. PATENT DOCUMENTS

| | | | |
|---|---|---|---|
| 7,349,955 | B1 | 3/2008 | Korb et al. |
| 7,352,280 | B1 | 4/2008 | Rockwood |
| 7,359,962 | B2 | 4/2008 | Willebeek-Lemair et al. |
| 7,363,170 | B2 | 4/2008 | Seul et al. |
| 7,373,669 | B2 | 5/2008 | Eisen |
| 7,376,618 | B1 | 5/2008 | Anderson et al. |
| 7,379,891 | B1 | 5/2008 | Donner et al. |
| 7,386,892 | B2 | 6/2008 | Gilfix et al. |
| 7,401,082 | B2 | 7/2008 | Keene et al. |
| 7,403,922 | B1 | 7/2008 | Lewis et al. |
| 7,404,087 | B2 | 7/2008 | Teunen |
| 7,406,441 | B2 | 7/2008 | Kimura et al. |
| 7,428,587 | B2 | 9/2008 | Rowland et al. |
| 7,436,780 | B2 | 10/2008 | Stephens |
| 7,438,226 | B2 | 10/2008 | Helsper et al. |
| 7,447,494 | B2 | 11/2008 | Law et al. |
| 7,451,487 | B2 | 11/2008 | Oliver et al. |
| 7,457,401 | B2 | 11/2008 | Lawyer et al. |
| 7,457,823 | B2 | 11/2008 | Shraim et al. |
| 7,475,242 | B2 | 1/2009 | Baird et al. |
| 7,478,182 | B2 | 1/2009 | Schweig |
| 7,487,350 | B2 | 2/2009 | Utin |
| 7,496,752 | B2 | 2/2009 | Yamaguchi et al. |
| 7,497,374 | B2 | 3/2009 | Helsper et al. |
| 7,502,610 | B2 | 3/2009 | Maher |
| 7,502,933 | B2 | 3/2009 | Jakobsson et al. |
| 7,526,796 | B2 | 4/2009 | Lulich et al. |
| 7,543,740 | B2 | 6/2009 | Greene et al. |
| 7,552,090 | B1 | 6/2009 | Barber |
| 7,555,458 | B1 | 6/2009 | Felger |
| 7,562,221 | B2 | 7/2009 | Nyström et al. |
| 7,577,620 | B1 | 8/2009 | Donner |
| 7,581,112 | B2 | 8/2009 | Brown et al. |
| 7,606,560 | B2 | 10/2009 | Labrou et al. |
| 7,630,924 | B1 * | 12/2009 | Collins ............ G06Q 10/025 379/189 |
| 7,631,808 | B2 * | 12/2009 | Kundu ............... G06V 20/41 235/383 |
| 7,657,626 | B1 | 2/2010 | Zwicky |
| 7,660,902 | B2 | 2/2010 | Graham et al. |
| 7,665,140 | B2 | 2/2010 | Oliver et al. |
| 7,665,658 | B2 | 2/2010 | Fields |
| 7,673,793 | B2 | 3/2010 | Greene et al. |
| 7,685,629 | B1 | 3/2010 | White et al. |
| 7,698,743 | B2 | 4/2010 | Ohmori et al. |
| 7,708,200 | B2 | 5/2010 | Helsper et al. |
| 7,711,846 | B2 | 5/2010 | Padmanabhan et al. |
| 7,735,141 | B1 | 6/2010 | Noel et al. |
| 7,739,402 | B2 | 6/2010 | Roese et al. |
| 7,739,512 | B2 | 6/2010 | Hawkes |
| 7,743,409 | B2 | 6/2010 | Gonzalez et al. |
| 7,752,084 | B2 | 7/2010 | Pettitt |
| 7,756,783 | B2 | 7/2010 | Crooks |
| 7,761,379 | B2 | 7/2010 | Zoldi et al. |
| 7,769,032 | B1 | 8/2010 | Ou |
| 7,778,846 | B2 | 8/2010 | Suresh et al. |
| 7,788,195 | B1 | 8/2010 | Subramanian et al. |
| 7,813,937 | B1 | 10/2010 | Pathria et al. |
| 7,813,944 | B1 | 10/2010 | Luk et al. |
| 7,814,029 | B1 | 10/2010 | Siegel |
| 7,849,029 | B2 | 12/2010 | Crooks et al. |
| 7,849,307 | B2 | 12/2010 | Roskind |
| 7,853,526 | B2 | 12/2010 | Milana |
| 7,853,533 | B2 | 12/2010 | Eisen |
| 7,856,372 | B2 | 12/2010 | Ullah |
| 7,860,783 | B2 | 12/2010 | Yang et al. |
| 7,861,260 | B2 | 12/2010 | Shkedi |
| 7,865,427 | B2 | 1/2011 | Wright et al. |
| 7,882,217 | B2 | 2/2011 | Katzir |
| 7,908,223 | B2 | 3/2011 | Klein et al. |
| 7,908,645 | B2 | 3/2011 | Varghese et al. |
| 7,930,285 | B2 | 4/2011 | Abraham et al. |
| 7,933,984 | B1 | 4/2011 | Smith et al. |
| 7,937,467 | B2 | 5/2011 | Barber |
| 7,940,929 | B1 | 5/2011 | Sengupta |
| 7,945,494 | B2 | 5/2011 | Williams |
| 7,945,515 | B2 | 5/2011 | Zoldi et al. |
| 7,949,564 | B1 | 5/2011 | Hughes et al. |
| 7,958,029 | B1 | 6/2011 | Bobich et al. |
| 7,958,246 | B2 | 6/2011 | Barber |
| 7,961,857 | B2 | 6/2011 | Zoldi et al. |
| 7,970,701 | B2 | 6/2011 | Lewis et al. |
| 7,983,490 | B1 | 7/2011 | Minter |
| 7,983,691 | B1 | 7/2011 | Wong et al. |
| 7,991,716 | B2 | 8/2011 | Crooks et al. |
| 7,995,996 | B2 | 8/2011 | Link, II et al. |
| 8,001,376 | B2 | 8/2011 | Utin |
| 8,001,597 | B2 | 8/2011 | Crooks |
| 8,015,614 | B2 | 9/2011 | Matsuzaki et al. |
| 8,015,921 | B2 | 9/2011 | Leppanen et al. |
| 8,019,678 | B2 | 9/2011 | Wright et al. |
| 8,020,763 | B1 | 9/2011 | Kowalchyk et al. |
| 8,024,266 | B1 | 9/2011 | Barber |
| 8,025,220 | B2 | 9/2011 | Zoldi et al. |
| 8,027,439 | B2 | 9/2011 | Zoldi et al. |
| 8,032,448 | B2 | 10/2011 | Anderson et al. |
| 8,037,097 | B2 | 10/2011 | Guo et al. |
| 8,037,511 | B1 | 10/2011 | Lundy et al. |
| 8,041,597 | B2 | 10/2011 | Li et al. |
| 8,042,164 | B2 | 10/2011 | Sheynblat et al. |
| 8,046,271 | B2 | 10/2011 | Jimenez et al. |
| 8,060,922 | B2 | 11/2011 | Crichton et al. |
| 8,065,233 | B2 | 11/2011 | Lee et al. |
| 8,090,648 | B2 | 1/2012 | Zoldi et al. |
| 8,108,378 | B2 | 1/2012 | Ott, IV et al. |
| 8,121,962 | B2 | 2/2012 | Vaiciulis et al. |
| 8,122,082 | B2 | 2/2012 | Klein |
| 8,126,816 | B2 | 2/2012 | Mu et al. |
| 8,131,615 | B2 | 3/2012 | Diev et al. |
| 8,140,689 | B2 | 3/2012 | Barber |
| 8,141,148 | B2 | 3/2012 | Thomas et al. |
| 8,145,560 | B2 | 3/2012 | Kulkarni et al. |
| 8,145,762 | B2 | 3/2012 | Barber |
| 8,150,968 | B2 | 4/2012 | Barber |
| 8,151,327 | B2 | 4/2012 | Eisen |
| 8,166,068 | B2 | 4/2012 | Stevens |
| 8,175,897 | B2 | 5/2012 | Lee et al. |
| 8,176,178 | B2 | 5/2012 | Thomas et al. |
| 8,180,686 | B2 | 5/2012 | Ryu et al. |
| 8,181,015 | B2 | 5/2012 | Roskind |
| 8,185,953 | B2 | 5/2012 | Rothstein et al. |
| 8,190,513 | B2 | 5/2012 | Felger |
| 8,190,529 | B2 | 5/2012 | Abe et al. |
| 8,191,148 | B2 | 5/2012 | Oliver et al. |
| 8,200,527 | B1 | 6/2012 | Thompson |
| 8,201,099 | B1 | 6/2012 | Osbourn et al. |
| 8,204,833 | B2 | 6/2012 | Mu et al. |
| 8,209,744 | B2 | 6/2012 | Zhu et al. |
| 8,209,760 | B1 | 6/2012 | Hardman |
| 8,213,898 | B2 | 7/2012 | Choti et al. |
| 8,214,232 | B2 | 7/2012 | Tyler et al. |
| 8,214,285 | B2 | 7/2012 | Hu et al. |
| 8,219,415 | B2 | 7/2012 | Tyler et al. |
| 8,224,308 | B1 | 7/2012 | Gavrylyako et al. |
| 8,224,348 | B2 | 7/2012 | Bolon et al. |
| 8,229,844 | B2 | 7/2012 | Felger |
| 8,250,631 | B2 | 8/2012 | Iyengar et al. |
| 8,266,295 | B2 | 9/2012 | Klein et al. |
| 8,271,891 | B1 | 9/2012 | Osbourn et al. |
| 8,272,061 | B1 | 9/2012 | Lotem et al. |
| 8,280,833 | B2 | 10/2012 | Miltonberger |
| 8,290,838 | B1 | 10/2012 | Thakur et al. |
| 8,295,898 | B2 | 10/2012 | Ashfield et al. |
| 8,296,228 | B1 | 10/2012 | Kloor |
| 8,296,229 | B1 | 10/2012 | Yellin et al. |
| 8,296,245 | B2 | 10/2012 | Barber et al. |
| 8,296,250 | B2 | 10/2012 | Crooks et al. |
| 8,306,933 | B2 | 11/2012 | Kawai et al. |
| 8,307,430 | B1 | 11/2012 | Chen et al. |
| 8,311,907 | B2 | 11/2012 | Klein et al. |
| 8,321,269 | B2 | 11/2012 | Linden et al. |
| 8,326,759 | B2 | 12/2012 | Hammad |
| 8,326,760 | B2 | 12/2012 | Ma et al. |
| 8,326,763 | B2 | 12/2012 | Zuili |

(56) References Cited

U.S. PATENT DOCUMENTS

| | | |
|---|---|---|
| 8,332,338 B2 | 12/2012 | Vaiciulis et al. |
| 8,332,522 B2 | 12/2012 | Barber |
| 8,370,253 B1 | 2/2013 | Grossman et al. |
| 8,370,638 B2 | 2/2013 | Duane et al. |
| 8,380,831 B2 | 2/2013 | Barber |
| 8,392,987 B2 | 3/2013 | Sasamura et al. |
| 8,407,112 B2 | 3/2013 | Walter |
| 8,407,798 B1 | 3/2013 | Lotem et al. |
| 8,417,587 B2 | 4/2013 | Jimenez et al. |
| 8,423,458 B2 | 4/2013 | Barber |
| 8,424,061 B2 | 4/2013 | Rosenor |
| 8,429,070 B2 | 4/2013 | Hu et al. |
| 8,438,134 B2 | 5/2013 | Wang et al. |
| 8,438,184 B1 | 5/2013 | Wang |
| 8,443,202 B2 | 5/2013 | White et al. |
| 8,452,715 B2 | 5/2013 | Barber |
| 8,453,226 B2 | 5/2013 | Hammad |
| 8,462,161 B1 | 6/2013 | Barber |
| 8,464,290 B2 | 6/2013 | Beyda et al. |
| 8,468,582 B2 | 6/2013 | Kuang et al. |
| 8,484,470 B2 | 7/2013 | Sakakihara et al. |
| 8,495,714 B2 | 7/2013 | Jones et al. |
| 8,516,439 B2 | 8/2013 | Brass et al. |
| 8,539,070 B2 | 9/2013 | Barber |
| 8,543,522 B2 | 9/2013 | Ryman-Tubb et al. |
| 8,548,137 B2 | 10/2013 | Zoldi et al. |
| 8,559,607 B2 | 10/2013 | Zoldi et al. |
| 8,567,669 B2 | 10/2013 | Griegel et al. |
| 8,588,816 B2 | 11/2013 | Collins |
| 8,601,109 B2 | 12/2013 | Johannsen |
| 8,611,856 B2 | 12/2013 | Yan et al. |
| 8,612,854 B2 | 12/2013 | Eisen et al. |
| 8,620,942 B1 | 12/2013 | Hoffman et al. |
| 8,631,006 B1 | 1/2014 | Haveliwala et al. |
| 8,660,539 B2 | 2/2014 | Khambete et al. |
| 8,661,119 B1 | 2/2014 | Jindal et al. |
| 8,676,684 B2 | 3/2014 | Newman et al. |
| 8,677,398 B2 | 3/2014 | Shkedi |
| 8,683,561 B2 | 3/2014 | Utin |
| 8,688,543 B2 | 4/2014 | Dominquez |
| 8,701,168 B2 | 4/2014 | Sastry et al. |
| 8,701,170 B1 | 4/2014 | Barber |
| 8,725,570 B2 | 5/2014 | Doughty et al. |
| 8,751,815 B2 | 6/2014 | Lunde et al. |
| 8,762,283 B2 | 6/2014 | Gerber et al. |
| 8,762,574 B2 | 6/2014 | Barber |
| 8,763,113 B2 | 6/2014 | Thomas et al. |
| 8,776,225 B2 | 7/2014 | Pierson et al. |
| 8,779,981 B2 | 7/2014 | Eisen et al. |
| 8,781,975 B2 | 7/2014 | Bennett et al. |
| 8,782,783 B2 | 7/2014 | Thomas et al. |
| 8,799,458 B2 | 8/2014 | Barber |
| 8,817,984 B2 | 8/2014 | Miller et al. |
| 8,826,393 B2 | 9/2014 | Eisen |
| 8,838,478 B2 | 9/2014 | Kretz et al. |
| 8,838,967 B1 | 9/2014 | Mills et al. |
| 8,862,514 B2 | 10/2014 | Eisen |
| 8,862,526 B2 | 10/2014 | Miltonberger |
| 8,874,735 B2 | 10/2014 | Barber |
| 8,880,097 B1 | 11/2014 | Xu et al. |
| 8,881,288 B1 | 11/2014 | Levy et al. |
| 8,938,671 B2 | 1/2015 | Eisen et al. |
| 8,954,560 B2 | 2/2015 | Johannsen |
| 8,966,276 B2 | 2/2015 | Nanopoulos et al. |
| 9,037,483 B1 | 5/2015 | Curcio et al. |
| 9,038,153 B2 | 5/2015 | Barber |
| 9,060,012 B2 | 6/2015 | Eisen |
| 9,075,896 B2 | 7/2015 | Barber |
| 9,083,735 B2 | 7/2015 | Reumann et al. |
| 9,098,617 B1 | 8/2015 | Pauley, Jr. et al. |
| 9,112,850 B1 | 8/2015 | Eisen |
| 9,118,646 B2 | 8/2015 | Pierson et al. |
| 9,135,293 B1 | 9/2015 | Kienzle |
| 9,172,691 B2 | 10/2015 | Barber |
| 9,177,293 B1 | 11/2015 | Gagnon et al. |
| 9,183,567 B2 | 11/2015 | Barber |
| 9,191,370 B2 | 11/2015 | Barber et al. |
| 9,196,004 B2 | 11/2015 | Eisen |
| 9,202,039 B2 | 12/2015 | Dandu et al. |
| 9,203,837 B2 | 12/2015 | Pierson et al. |
| 9,294,448 B2 | 3/2016 | Miller et al. |
| 9,298,677 B2 | 3/2016 | Tollinger et al. |
| 9,332,020 B2 | 5/2016 | Thomas et al. |
| 9,361,597 B2 | 6/2016 | Britton et al. |
| 9,378,500 B2 | 6/2016 | Jimenez et al. |
| 9,390,384 B2 | 7/2016 | Eisen |
| 9,396,331 B2 | 7/2016 | Eisen et al. |
| 9,412,123 B2 | 8/2016 | Eisen |
| 9,477,968 B2 | 10/2016 | Barber |
| 9,514,248 B1 | 12/2016 | Guan et al. |
| 9,514,446 B1 | 12/2016 | Rajkumar et al. |
| 9,521,161 B2 | 12/2016 | Reumann et al. |
| 9,521,551 B2 | 12/2016 | Eisen et al. |
| 9,559,852 B2 | 1/2017 | Miller et al. |
| 9,603,016 B1 | 3/2017 | Mills et al. |
| 9,633,201 B1 | 4/2017 | Katz |
| 9,699,164 B2 | 7/2017 | Barber |
| 9,702,961 B2 | 7/2017 | Shields |
| 9,703,983 B2 | 7/2017 | Eisen et al. |
| 9,712,497 B2 | 7/2017 | Barber et al. |
| 9,722,968 B2 | 8/2017 | Barber |
| 9,754,256 B2 | 9/2017 | Britton et al. |
| 9,754,311 B2 | 9/2017 | Eisen |
| 9,781,151 B1 | 10/2017 | McCorkendale et al. |
| 9,785,973 B2 | 10/2017 | Tollinger et al. |
| 9,916,393 B2 | 3/2018 | Barber |
| 9,948,629 B2 | 4/2018 | Eisen |
| 9,990,631 B2 | 6/2018 | Eisen |
| 10,007,895 B2 | 6/2018 | Vanasco |
| 10,021,099 B2 | 7/2018 | Eisen et al. |
| 10,037,529 B2 | 7/2018 | Barber |
| 10,089,679 B2 | 10/2018 | Eisen |
| 10,091,312 B1 | 10/2018 | Khanwalkar et al. |
| 10,123,368 B2 | 11/2018 | Gundavelli et al. |
| 10,231,120 B2 | 3/2019 | Nethi et al. |
| 10,248,968 B2 | 4/2019 | Sivaramakrishnan et al. |
| 10,290,017 B2 | 5/2019 | Traasdahl et al. |
| 10,305,880 B2 | 5/2019 | Barber |
| 10,321,309 B2 | 6/2019 | Lee et al. |
| 10,339,306 B1 | 7/2019 | Katz |
| 10,341,344 B2 | 7/2019 | Eisen et al. |
| 10,395,252 B2 | 8/2019 | Eisen |
| 10,402,854 B2 | 9/2019 | Barber |
| 10,417,637 B2 | 9/2019 | Eisen |
| 10,425,379 B2 | 9/2019 | Barber |
| 10,453,066 B2 | 10/2019 | Eisen |
| 10,510,094 B2 | 12/2019 | Sivaramakrishnan et al. |
| 10,535,093 B2 | 1/2020 | Eisen |
| 10,616,201 B2 | 4/2020 | Eisen |
| 10,642,899 B2 | 5/2020 | Barber |
| 10,679,216 B2 | 6/2020 | Barber |
| 10,691,751 B2 | 6/2020 | Atlas et al. |
| 10,726,151 B2 | 7/2020 | Eisen et al. |
| 10,728,350 B1 | 7/2020 | Khanwalkar et al. |
| 10,754,913 B2 | 8/2020 | Liodden et al. |
| 10,853,813 B2 | 12/2020 | Eisen |
| 10,862,889 B2 | 12/2020 | Eisen et al. |
| 10,902,327 B1 | 1/2021 | Yalov et al. |
| 10,956,732 B2 | 3/2021 | Henaff |
| 10,984,128 B1 | 4/2021 | Hoffer |
| 10,999,298 B2 | 5/2021 | Eisen |
| 11,010,468 B1 | 5/2021 | Katz |
| 11,095,643 B2 | 8/2021 | Huffman et al. |
| 11,176,200 B2 | 11/2021 | Barber |
| 11,176,573 B2 | 11/2021 | Barber |
| 11,177,967 B2 | 11/2021 | Pala |
| 11,195,225 B2 | 12/2021 | Eisen |
| 11,223,621 B2 | 1/2022 | Cano et al. |
| 11,238,456 B2 | 2/2022 | Eisen |
| 11,240,326 B1 | 2/2022 | Khanwalkar et al. |
| 11,301,585 B2 | 4/2022 | Eisen et al. |
| 11,301,860 B2 | 4/2022 | Eisen |
| 11,314,838 B2 | 4/2022 | Liodden et al. |
| 11,410,179 B2 | 8/2022 | Eisen |

(56) References Cited

U.S. PATENT DOCUMENTS

| | | |
|---|---|---|
| 11,657,299 B1 | 5/2023 | Yalov et al. |
| 11,675,868 B2 | 6/2023 | Putnam |
| 11,683,306 B2 | 6/2023 | Eisen et al. |
| 11,683,326 B2 | 6/2023 | Eisen |
| 11,727,471 B2 | 8/2023 | Eisen |
| 11,750,584 B2 | 9/2023 | Eisen |
| 11,886,575 B1 | 1/2024 | Katz |
| 11,895,204 B1 | 2/2024 | Khanwalkar et al. |
| 11,922,423 B2 | 3/2024 | Eisen |
| 12,002,053 B2 | 6/2024 | Eisen |
| 12,045,736 B1 | 7/2024 | Yalov et al. |
| 12,058,131 B2 | 8/2024 | Eisen et al. |
| 12,079,368 B2 | 9/2024 | Eisen et al. |
| 12,093,992 B2 | 9/2024 | Eisen |
| 12,132,719 B2 | 10/2024 | Eisen |
| 12,153,666 B1 | 11/2024 | Katz |
| 2001/0011243 A1 | 8/2001 | Dembo et al. |
| 2001/0011304 A1 | 8/2001 | Wesigner et al. |
| 2001/0016840 A1 | 8/2001 | Hijikata et al. |
| 2001/0016876 A1 | 8/2001 | Kurth et al. |
| 2001/0018739 A1 | 8/2001 | Anderson et al. |
| 2001/0034712 A1 | 10/2001 | Colvin |
| 2001/0046096 A1 | 11/2001 | Worden |
| 2002/0035622 A1 | 3/2002 | Barber |
| 2002/0041328 A1 | 4/2002 | LeCompte et al. |
| 2002/0046157 A1 | 4/2002 | Solomon |
| 2002/0052852 A1 | 5/2002 | Bozeman |
| 2002/0056042 A1 | 5/2002 | van der Kaay et al. |
| 2002/0073046 A1 | 6/2002 | David |
| 2002/0073099 A1 | 6/2002 | Gilbert et al. |
| 2002/0073327 A1 | 6/2002 | Vellandi |
| 2002/0083079 A1 | 6/2002 | Meier et al. |
| 2002/0112171 A1 | 8/2002 | Ginter et al. |
| 2002/0128917 A1 | 9/2002 | Grounds |
| 2002/0133721 A1 | 9/2002 | Adjaoute |
| 2002/0138335 A1 | 9/2002 | Palmer et al. |
| 2002/0138577 A1 | 9/2002 | Teng et al. |
| 2002/0153424 A1 | 10/2002 | Li |
| 2002/0156724 A1 | 10/2002 | Levchin et al. |
| 2002/0156836 A1 | 10/2002 | Janosik, Jr. et al. |
| 2002/0166063 A1 | 11/2002 | Lachman et al. |
| 2002/0167965 A1 | 11/2002 | Beasley et al. |
| 2002/0194119 A1 | 12/2002 | Wright et al. |
| 2003/0002732 A1 | 1/2003 | Gossett et al. |
| 2003/0002740 A1 | 1/2003 | Melikian et al. |
| 2003/0014327 A1 | 1/2003 | Skantze |
| 2003/0033161 A1 | 2/2003 | Walker et al. |
| 2003/0033356 A1 | 2/2003 | Tran et al. |
| 2003/0058277 A1 | 3/2003 | Bowman-Amuah |
| 2003/0070080 A1 | 4/2003 | Rosen |
| 2003/0074301 A1 | 4/2003 | Solomon |
| 2003/0076242 A1 | 4/2003 | Burns et al. |
| 2003/0105707 A1 | 6/2003 | Audebert et al. |
| 2003/0105854 A1 | 6/2003 | Thorsteinsson et al. |
| 2003/0113033 A1 | 6/2003 | Huang |
| 2003/0115334 A1 | 6/2003 | Bhat et al. |
| 2003/0115481 A1 | 6/2003 | Baird et al. |
| 2003/0120543 A1 | 6/2003 | Carey |
| 2003/0120586 A1 | 6/2003 | Litty |
| 2003/0140258 A1 | 7/2003 | Nelson et al. |
| 2003/0140283 A1 | 7/2003 | Nishio |
| 2003/0154214 A1 | 8/2003 | Tu et al. |
| 2003/0158751 A1 | 8/2003 | Suresh et al. |
| 2003/0163359 A1 | 8/2003 | Kanesaka |
| 2003/0163398 A1 | 8/2003 | Yoshioka et al. |
| 2003/0163413 A1 | 8/2003 | Wiczkowski |
| 2003/0172036 A1 | 9/2003 | Feigenbaum |
| 2003/0182551 A1 | 9/2003 | Frantz et al. |
| 2003/0208684 A1 | 11/2003 | Camacho et al. |
| 2003/0212618 A1 | 11/2003 | Keyes et al. |
| 2003/0233553 A1 | 12/2003 | Parks et al. |
| 2003/0237000 A1 | 12/2003 | Denton et al. |
| 2004/0001044 A1 | 1/2004 | Luciani et al. |
| 2004/0004733 A1 | 1/2004 | Barker et al. |
| 2004/0006553 A1 | 1/2004 | de Vries et al. |
| 2004/0010682 A1 | 1/2004 | Foster et al. |
| 2004/0027385 A1 | 2/2004 | Rekimoto et al. |
| 2004/0030912 A1 | 2/2004 | Merkle, Jr. et al. |
| 2004/0034794 A1 | 2/2004 | Mayer et al. |
| 2004/0066023 A1 | 4/2004 | Joseph |
| 2004/0073809 A1 | 4/2004 | Wing Keong |
| 2004/0088313 A1 | 5/2004 | Torres |
| 2004/0098618 A1 | 5/2004 | Kim et al. |
| 2004/0105431 A1 | 6/2004 | Monjas-Llorente et al. |
| 2004/0111621 A1 | 6/2004 | Himberger et al. |
| 2004/0111632 A1 | 6/2004 | Halperin |
| 2004/0117321 A1 | 6/2004 | Sancho |
| 2004/0139008 A1 | 7/2004 | Mascavaage, III |
| 2004/0153644 A1 | 8/2004 | McCorkendale et al. |
| 2004/0159699 A1 | 8/2004 | Nelson et al. |
| 2004/0166857 A1 | 8/2004 | Shim et al. |
| 2004/0171381 A1 | 9/2004 | Inselberg |
| 2004/0181598 A1 | 9/2004 | Paya et al. |
| 2004/0187023 A1 | 9/2004 | Alagna et al. |
| 2004/0203750 A1 | 10/2004 | Cowdrey et al. |
| 2004/0230820 A1 | 11/2004 | Hui Hsu et al. |
| 2004/0236696 A1 | 11/2004 | Aoki et al. |
| 2004/0236702 A1 | 11/2004 | Fink et al. |
| 2004/0254890 A1 | 12/2004 | Sancho et al. |
| 2004/0260876 A1 | 12/2004 | Singh et al. |
| 2004/0260922 A1 | 12/2004 | Goodman et al. |
| 2005/0008148 A1 | 1/2005 | Jacobson |
| 2005/0015601 A1 | 1/2005 | Tabi |
| 2005/0021360 A1 | 1/2005 | Miller et al. |
| 2005/0022020 A1 | 1/2005 | Fremberg et al. |
| 2005/0033653 A1 | 2/2005 | Eisenberg et al. |
| 2005/0033703 A1 | 2/2005 | Holdsworth |
| 2005/0039034 A1 | 2/2005 | Doyle et al. |
| 2005/0039219 A1 | 2/2005 | Cooper et al. |
| 2005/0074015 A1 | 4/2005 | Chari et al. |
| 2005/0076230 A1 | 4/2005 | Redenbaugh et al. |
| 2005/0085931 A1 | 4/2005 | Willeby |
| 2005/0097320 A1 | 5/2005 | Golan et al. |
| 2005/0108177 A1 | 5/2005 | Sancho |
| 2005/0111054 A1 | 5/2005 | Umeda |
| 2005/0113092 A1 | 5/2005 | Coppinger et al. |
| 2005/0131826 A1 | 6/2005 | Cook |
| 2005/0138110 A1 | 6/2005 | Redlich et al. |
| 2005/0165643 A1 | 7/2005 | Wilson et al. |
| 2005/0185225 A1 | 8/2005 | Brawn et al. |
| 2005/0187883 A1 | 8/2005 | Bishop et al. |
| 2005/0188423 A1 | 8/2005 | Motsinger et al. |
| 2005/0204159 A1 | 9/2005 | Davis et al. |
| 2005/0210533 A1 | 9/2005 | Copeland et al. |
| 2005/0246551 A1 | 11/2005 | Dondl et al. |
| 2005/0262002 A1 | 11/2005 | Manning et al. |
| 2005/0278542 A1 | 12/2005 | Pierson et al. |
| 2006/0008779 A1 | 1/2006 | Shand et al. |
| 2006/0010072 A1 | 1/2006 | Eisen |
| 2006/0026669 A1 | 2/2006 | Zakas |
| 2006/0031938 A1 | 2/2006 | Choi |
| 2006/0048211 A1 | 3/2006 | Pierson et al. |
| 2006/0059253 A1 | 3/2006 | Goodman |
| 2006/0059568 A1 | 3/2006 | Smith-Mickelson |
| 2006/0064346 A1 | 3/2006 | Steenstra et al. |
| 2006/0069619 A1 | 3/2006 | Walker et al. |
| 2006/0075492 A1 | 4/2006 | Golan et al. |
| 2006/0080263 A1 | 4/2006 | Willis et al. |
| 2006/0126829 A1 | 6/2006 | Lai |
| 2006/0130132 A1 | 6/2006 | Dharmarajan |
| 2006/0155985 A1 | 7/2006 | Canard et al. |
| 2006/0161501 A1 | 7/2006 | Waserstein et al. |
| 2006/0176984 A1 | 8/2006 | Lee et al. |
| 2006/0190331 A1 | 8/2006 | Tollinger et al. |
| 2006/0190489 A1 | 8/2006 | Vohariwatt et al. |
| 2006/0200855 A1 | 9/2006 | Willis |
| 2006/0200856 A1 | 9/2006 | Salowey et al. |
| 2006/0224898 A1 | 10/2006 | Ahmed |
| 2006/0237531 A1 | 10/2006 | Heffez et al. |
| 2006/0253327 A1 | 11/2006 | Morris et al. |
| 2006/0253328 A1 | 11/2006 | Kohli et al. |
| 2006/0264202 A1 | 11/2006 | Hagmeier et al. |
| 2006/0281541 A1 | 12/2006 | Nguyen et al. |
| 2006/0282660 A1 | 12/2006 | Varghese et al. |

(56) References Cited

U.S. PATENT DOCUMENTS

| | | |
|---|---|---|
| 2006/0284838 A1 | 12/2006 | Tsatalos et al. |
| 2007/0011078 A1 | 1/2007 | Jain et al. |
| 2007/0026942 A1 | 2/2007 | Kinsley et al. |
| 2007/0030528 A1 | 2/2007 | Quaeler et al. |
| 2007/0038568 A1 | 2/2007 | Greene et al. |
| 2007/0043837 A1 | 2/2007 | Kruse et al. |
| 2007/0061211 A1 | 3/2007 | Ramer et al. |
| 2007/0061273 A1 | 3/2007 | Greene et al. |
| 2007/0073630 A1 | 3/2007 | Greene et al. |
| 2007/0094594 A1 | 4/2007 | Matichuk et al. |
| 2007/0097076 A1 | 5/2007 | Gross |
| 2007/0097976 A1 | 5/2007 | Wood et al. |
| 2007/0101405 A1 | 5/2007 | Engle et al. |
| 2007/0107059 A1 | 5/2007 | Chasin et al. |
| 2007/0118892 A1 | 5/2007 | Sastry et al. |
| 2007/0124246 A1 | 5/2007 | Lawyer et al. |
| 2007/0162763 A1 | 7/2007 | Bender et al. |
| 2007/0174164 A1* | 7/2007 | Biffle .......... G06Q 20/24 705/35 |
| 2007/0192240 A1 | 8/2007 | Crooks |
| 2007/0198410 A1 | 8/2007 | Labgold et al. |
| 2007/0199054 A1 | 8/2007 | Florencio et al. |
| 2007/0204044 A1 | 8/2007 | Rice et al. |
| 2007/0208619 A1 | 9/2007 | Branam et al. |
| 2007/0214151 A1 | 9/2007 | Scott et al. |
| 2007/0220594 A1 | 9/2007 | Tulsyan |
| 2007/0233599 A1 | 10/2007 | Ganesan et al. |
| 2007/0233759 A1 | 10/2007 | Tomlinson et al. |
| 2007/0234070 A1 | 10/2007 | Horning et al. |
| 2007/0239604 A1 | 10/2007 | O'Connell et al. |
| 2007/0255821 A1 | 11/2007 | Ge et al. |
| 2007/0266257 A1 | 11/2007 | Camaisa et al. |
| 2007/0271466 A1 | 11/2007 | Mak |
| 2007/0294401 A1 | 12/2007 | Shkedi |
| 2007/0297459 A1 | 12/2007 | Cucos et al. |
| 2008/0002725 A1 | 1/2008 | Alicherry et al. |
| 2008/0005394 A1 | 1/2008 | Crooks |
| 2008/0010367 A1 | 1/2008 | Chen et al. |
| 2008/0010678 A1 | 1/2008 | Burdette et al. |
| 2008/0015988 A1 | 1/2008 | Brown et al. |
| 2008/0021801 A1 | 1/2008 | Song et al. |
| 2008/0040653 A1 | 2/2008 | Levine |
| 2008/0040802 A1 | 2/2008 | Pierson et al. |
| 2008/0043634 A1 | 2/2008 | Wang et al. |
| 2008/0045201 A1 | 2/2008 | Kies |
| 2008/0046562 A1 | 2/2008 | Butler |
| 2008/0049779 A1 | 2/2008 | Hopmann et al. |
| 2008/0052629 A1 | 2/2008 | Phillips et al. |
| 2008/0098222 A1 | 4/2008 | Zilberman |
| 2008/0101277 A1 | 5/2008 | Taylor |
| 2008/0104070 A1 | 5/2008 | Lonchar |
| 2008/0104672 A1 | 5/2008 | Lunde et al. |
| 2008/0109307 A1 | 5/2008 | Ullah |
| 2008/0120195 A1 | 5/2008 | Shakkarwar |
| 2008/0120214 A1 | 5/2008 | Steele et al. |
| 2008/0121690 A1 | 5/2008 | Carani et al. |
| 2008/0126180 A1 | 5/2008 | Ullah |
| 2008/0133420 A1 | 6/2008 | Barber |
| 2008/0162200 A1 | 7/2008 | O'Sullivan et al. |
| 2008/0162202 A1 | 7/2008 | Khanna et al. |
| 2008/0162475 A1 | 7/2008 | Meggs |
| 2008/0163128 A1 | 7/2008 | Callanan et al. |
| 2008/0184355 A1 | 7/2008 | Walrath et al. |
| 2008/0184372 A1 | 7/2008 | Hoshina |
| 2008/0189790 A1 | 8/2008 | Park |
| 2008/0191007 A1 | 8/2008 | Keay |
| 2008/0201214 A1 | 8/2008 | Aaron |
| 2008/0204788 A1 | 8/2008 | Kelly et al. |
| 2008/0222706 A1 | 9/2008 | Renaud et al. |
| 2008/0235623 A1 | 9/2008 | Li |
| 2008/0239365 A1 | 10/2008 | Salgado et al. |
| 2008/0249820 A1 | 10/2008 | Pathria et al. |
| 2008/0255944 A1 | 10/2008 | Shah et al. |
| 2008/0281606 A1 | 11/2008 | Kitts |
| 2008/0281941 A1 | 11/2008 | Park et al. |
| 2008/0288299 A1 | 11/2008 | Schultz |
| 2008/0301281 A1 | 12/2008 | Wang et al. |
| 2008/0306830 A1 | 12/2008 | Lasa et al. |
| 2008/0313079 A1 | 12/2008 | Van Bosch et al. |
| 2008/0319774 A1 | 12/2008 | O'Sullivan et al. |
| 2008/0319841 A1 | 12/2008 | Oliver et al. |
| 2009/0017805 A1 | 1/2009 | Sarukkai et al. |
| 2009/0018940 A1 | 1/2009 | Wang et al. |
| 2009/0024971 A1 | 1/2009 | Willner et al. |
| 2009/0037602 A1 | 2/2009 | Patel et al. |
| 2009/0044279 A1 | 2/2009 | Crawford et al. |
| 2009/0044282 A1 | 2/2009 | Govindaraju |
| 2009/0055398 A1 | 2/2009 | Zhu et al. |
| 2009/0055929 A1 | 2/2009 | Lee et al. |
| 2009/0070664 A1 | 3/2009 | Gavin et al. |
| 2009/0089869 A1 | 4/2009 | Varghese |
| 2009/0106413 A1 | 4/2009 | Salo |
| 2009/0138590 A1 | 5/2009 | Lee et al. |
| 2009/0138593 A1 | 5/2009 | Kalavade |
| 2009/0157417 A1 | 6/2009 | Bradley et al. |
| 2009/0164269 A1 | 6/2009 | Gupta et al. |
| 2009/0171760 A1 | 7/2009 | Aarnio et al. |
| 2009/0177692 A1 | 7/2009 | Chagoly et al. |
| 2009/0183010 A1 | 7/2009 | Schnell et al. |
| 2009/0187625 A1 | 7/2009 | Blackstock et al. |
| 2009/0198629 A1 | 8/2009 | De Prisco et al. |
| 2009/0203390 A1 | 8/2009 | Bradbury et al. |
| 2009/0205031 A1 | 8/2009 | Sato et al. |
| 2009/0210305 A1 | 8/2009 | Lyons |
| 2009/0222308 A1 | 9/2009 | Zoldi et al. |
| 2009/0228340 A1 | 9/2009 | Bohannon |
| 2009/0228585 A1 | 9/2009 | Kosbab et al. |
| 2009/0234738 A1 | 9/2009 | Britton et al. |
| 2009/0241174 A1 | 9/2009 | Rajan et al. |
| 2009/0254430 A1 | 10/2009 | Cherenson |
| 2009/0260064 A1 | 10/2009 | Mcdowell et al. |
| 2009/0265773 A1 | 10/2009 | Schultz |
| 2009/0271306 A1 | 10/2009 | Pierson |
| 2009/0280777 A1 | 11/2009 | Doherty |
| 2009/0292568 A1 | 11/2009 | Khosravani et al. |
| 2009/0293128 A1 | 11/2009 | Lippmann et al. |
| 2009/0296907 A1 | 12/2009 | Vendrow et al. |
| 2009/0298480 A1 | 12/2009 | Khambete et al. |
| 2009/0299911 A1 | 12/2009 | Abrahams et al. |
| 2009/0307119 A1 | 12/2009 | Ahles et al. |
| 2009/0307141 A1 | 12/2009 | Kongalath et al. |
| 2009/0313134 A1 | 12/2009 | Faith et al. |
| 2009/0327333 A1 | 12/2009 | Diener et al. |
| 2010/0005013 A1 | 1/2010 | Uriarte |
| 2010/0023382 A1 | 1/2010 | Fushimi et al. |
| 2010/0030641 A1 | 2/2010 | Ibenforth |
| 2010/0030777 A1 | 2/2010 | Panwar et al. |
| 2010/0057623 A1 | 3/2010 | Kapur et al. |
| 2010/0057843 A1 | 3/2010 | Landsman et al. |
| 2010/0070606 A1 | 3/2010 | Shenfield et al. |
| 2010/0082136 A1 | 4/2010 | Rosenblatt et al. |
| 2010/0082972 A1 | 4/2010 | Benco et al. |
| 2010/0094767 A1 | 4/2010 | Miltonberger |
| 2010/0094768 A1 | 4/2010 | Miltonberger |
| 2010/0106611 A1 | 4/2010 | Paulsen et al. |
| 2010/0107225 A1 | 4/2010 | Spencer et al. |
| 2010/0115115 A1 | 5/2010 | Terrill |
| 2010/0121716 A1 | 5/2010 | Golan |
| 2010/0138299 A1 | 6/2010 | Preston et al. |
| 2010/0145960 A1 | 6/2010 | Casteel et al. |
| 2010/0147945 A1 | 6/2010 | Bando et al. |
| 2010/0153540 A1 | 6/2010 | Li et al. |
| 2010/0157848 A1 | 6/2010 | Das et al. |
| 2010/0161424 A1 | 6/2010 | Sylvain |
| 2010/0161566 A1 | 6/2010 | Adair et al. |
| 2010/0161728 A1 | 6/2010 | Drozt et al. |
| 2010/0169157 A1 | 7/2010 | Muhonen et al. |
| 2010/0169192 A1 | 7/2010 | Zoldi et al. |
| 2010/0192082 A1 | 7/2010 | Sodah |
| 2010/0199332 A1 | 8/2010 | Bachmann et al. |
| 2010/0199338 A1 | 8/2010 | Craddock et al. |
| 2010/0211464 A1 | 8/2010 | Zhu et al. |
| 2010/0223105 A1 | 9/2010 | Gassewitz et al. |
| 2010/0223145 A1 | 9/2010 | Dragt |

(56) References Cited

U.S. PATENT DOCUMENTS

| | | |
|---|---|---|
| 2010/0228624 A1 | 9/2010 | Morris et al. |
| 2010/0228625 A1 | 9/2010 | Priyadarshan et al. |
| 2010/0228638 A1 | 9/2010 | Mikan et al. |
| 2010/0235220 A1 | 9/2010 | Guha et al. |
| 2010/0257065 A1 | 10/2010 | Gupta et al. |
| 2010/0262467 A1 | 10/2010 | Barnhill, Jr. et al. |
| 2010/0269175 A1 | 10/2010 | Stolfo et al. |
| 2010/0274678 A1 | 10/2010 | Rolf et al. |
| 2010/0293094 A1 | 11/2010 | Kolkowitz et al. |
| 2010/0306827 A1 | 12/2010 | Esteve Balducci et al. |
| 2010/0313009 A1 | 12/2010 | Combet et al. |
| 2010/0321296 A1 | 12/2010 | Gross |
| 2010/0333170 A1 | 12/2010 | Cox et al. |
| 2011/0015497 A1 | 1/2011 | Eggenberger et al. |
| 2011/0022483 A1 | 1/2011 | Hammad |
| 2011/0022517 A1 | 1/2011 | Hammad |
| 2011/0023115 A1 | 1/2011 | Wright |
| 2011/0029339 A1 | 2/2011 | Callahan |
| 2011/0035302 A1 | 2/2011 | Martell et al. |
| 2011/0047072 A1 | 2/2011 | Ciurea |
| 2011/0055627 A1 | 3/2011 | Zawacki et al. |
| 2011/0065490 A1 | 3/2011 | Lutnick |
| 2011/0082858 A1 | 4/2011 | Yu et al. |
| 2011/0106610 A1 | 5/2011 | Landis et al. |
| 2011/0112901 A1 | 5/2011 | Fried et al. |
| 2011/0119267 A1 | 5/2011 | Forman et al. |
| 2011/0153426 A1 | 6/2011 | Reddy et al. |
| 2011/0161228 A1 | 6/2011 | Suzuki et al. |
| 2011/0173281 A1 | 7/2011 | Smith |
| 2011/0184778 A1 | 7/2011 | Graepel et al. |
| 2011/0194679 A1 | 8/2011 | Patisaul et al. |
| 2011/0196791 A1* | 8/2011 | Dominguez .......... G06Q 40/00 705/44 |
| 2011/0225091 A1 | 9/2011 | Plastina et al. |
| 2011/0238575 A1* | 9/2011 | Nightengale ....... H04L 61/5007 705/44 |
| 2011/0251951 A1 | 10/2011 | Kolkowitz et al. |
| 2011/0258118 A1 | 10/2011 | Ciurea |
| 2011/0271225 A1 | 11/2011 | Van Roy et al. |
| 2011/0282778 A1 | 11/2011 | Wright et al. |
| 2011/0288932 A1 | 11/2011 | Marks et al. |
| 2011/0302087 A1 | 12/2011 | Crooks |
| 2011/0302096 A1 | 12/2011 | Lowry |
| 2011/0307341 A1 | 12/2011 | Zohar et al. |
| 2011/0313847 A1 | 12/2011 | Cao et al. |
| 2011/0314557 A1 | 12/2011 | Marshall |
| 2012/0022883 A1 | 1/2012 | Morrison |
| 2012/0030757 A1 | 2/2012 | Baikalov et al. |
| 2012/0030771 A1 | 2/2012 | Pierson et al. |
| 2012/0036042 A1 | 2/2012 | Graylin et al. |
| 2012/0036051 A1 | 2/2012 | Sachson |
| 2012/0036261 A1 | 2/2012 | Salazar et al. |
| 2012/0041841 A1 | 2/2012 | Hu et al. |
| 2012/0042361 A1 | 2/2012 | Wong et al. |
| 2012/0054136 A1 | 3/2012 | Maulik |
| 2012/0054847 A1 | 3/2012 | Schultz et al. |
| 2012/0059711 A1 | 3/2012 | Ramer et al. |
| 2012/0060863 A1 | 3/2012 | Speckmaier et al. |
| 2012/0078708 A1 | 3/2012 | Taylor et al. |
| 2012/0084203 A1 | 4/2012 | Mehew et al. |
| 2012/0084860 A1 | 4/2012 | Cao et al. |
| 2012/0094639 A1 | 4/2012 | Carlson et al. |
| 2012/0096076 A1 | 4/2012 | Chan |
| 2012/0101939 A1 | 4/2012 | Kasower |
| 2012/0150742 A1 | 6/2012 | Poon et al. |
| 2012/0150750 A1 | 6/2012 | Law et al. |
| 2012/0157062 A1 | 6/2012 | Kim et al. |
| 2012/0158586 A1 | 6/2012 | Ganti et al. |
| 2012/0166533 A1 | 6/2012 | Rubinstein et al. |
| 2012/0173465 A1 | 7/2012 | Hore et al. |
| 2012/0179558 A1 | 7/2012 | Fischer |
| 2012/0197981 A1 | 8/2012 | Chan |
| 2012/0204262 A1 | 8/2012 | Thomas et al. |
| 2012/0215777 A1 | 8/2012 | Malik et al. |
| 2012/0215896 A1 | 8/2012 | Johannsen |
| 2012/0216282 A1 | 8/2012 | Pappu et al. |
| 2012/0221404 A1 | 8/2012 | Ahmed et al. |
| 2012/0221470 A1 | 8/2012 | Lyon |
| 2012/0222111 A1 | 8/2012 | Oliver et al. |
| 2012/0233640 A1 | 9/2012 | Odryna et al. |
| 2012/0233665 A1* | 9/2012 | Ranganathan .......... G06F 21/51 726/4 |
| 2012/0239553 A1 | 9/2012 | Gonen et al. |
| 2012/0239574 A1 | 9/2012 | Smith et al. |
| 2012/0239774 A1 | 9/2012 | Tola et al. |
| 2012/0254320 A1 | 10/2012 | Dove et al. |
| 2012/0271860 A1 | 10/2012 | Graham, Jr. et al. |
| 2012/0278127 A1 | 11/2012 | Kirakosyan et al. |
| 2012/0278321 A1 | 11/2012 | Traub et al. |
| 2012/0295580 A1 | 11/2012 | Corner |
| 2012/0297380 A1 | 11/2012 | Colbert et al. |
| 2012/0299925 A1 | 11/2012 | Najork et al. |
| 2012/0311162 A1 | 12/2012 | Paulsen et al. |
| 2012/0323788 A1 | 12/2012 | Keresman et al. |
| 2012/0323836 A1 | 12/2012 | Wright et al. |
| 2012/0324027 A1 | 12/2012 | Vaynblat et al. |
| 2012/0324060 A1 | 12/2012 | Afergan et al. |
| 2012/0330787 A1 | 12/2012 | Hanson et al. |
| 2013/0005299 A1 | 1/2013 | Raleigh |
| 2013/0006743 A1 | 1/2013 | Moore et al. |
| 2013/0018789 A1 | 1/2013 | Kaufmann |
| 2013/0018791 A1 | 1/2013 | Mendicino et al. |
| 2013/0024300 A1 | 1/2013 | Choudhuri et al. |
| 2013/0036304 A1 | 2/2013 | Lin et al. |
| 2013/0040603 A1 | 2/2013 | Stahlberg et al. |
| 2013/0042298 A1 | 2/2013 | Plaza Fonseca et al. |
| 2013/0054433 A1 | 2/2013 | Giard et al. |
| 2013/0055388 A1 | 2/2013 | Thomas et al. |
| 2013/0073463 A1 | 3/2013 | Dimmick et al. |
| 2013/0073473 A1 | 3/2013 | Heath |
| 2013/0080327 A1* | 3/2013 | Baldrick ................ G06Q 20/24 705/44 |
| 2013/0085841 A1 | 4/2013 | Singleton et al. |
| 2013/0097673 A1 | 4/2013 | Meehan et al. |
| 2013/0097701 A1 | 4/2013 | Moyle et al. |
| 2013/0097706 A1 | 4/2013 | Titonis et al. |
| 2013/0103482 A1 | 4/2013 | Song et al. |
| 2013/0103629 A1 | 4/2013 | Vaiciulis et al. |
| 2013/0110623 A1 | 5/2013 | Kilroy et al. |
| 2013/0110637 A1 | 5/2013 | Bott |
| 2013/0111592 A1 | 5/2013 | Zhu et al. |
| 2013/0117832 A1 | 5/2013 | Gandhi |
| 2013/0124329 A1 | 5/2013 | Tengler |
| 2013/0124332 A1 | 5/2013 | Doughty et al. |
| 2013/0124333 A1 | 5/2013 | Doughty et al. |
| 2013/0129071 A1 | 5/2013 | Teitelman et al. |
| 2013/0144539 A1 | 6/2013 | Allen et al. |
| 2013/0148525 A1 | 6/2013 | Sanchez et al. |
| 2013/0159192 A1 | 6/2013 | Partridge et al. |
| 2013/0159195 A1 | 6/2013 | Kirillin et al. |
| 2013/0179878 A1 | 7/2013 | Dain |
| 2013/0185764 A1 | 7/2013 | Krstić et al. |
| 2013/0197998 A1 | 8/2013 | Buhrmann et al. |
| 2013/0198066 A1 | 8/2013 | Wall et al. |
| 2013/0204793 A1* | 8/2013 | Kerridge ............. G06Q 20/202 705/67 |
| 2013/0217330 A1 | 8/2013 | Gardenfors et al. |
| 2013/0218947 A1 | 8/2013 | Zur et al. |
| 2013/0226692 A1 | 8/2013 | Kouladjie et al. |
| 2013/0226717 A1 | 8/2013 | Ahluwalia et al. |
| 2013/0229693 A1 | 9/2013 | Harada |
| 2013/0253965 A1 | 9/2013 | Joseph |
| 2013/0290119 A1* | 10/2013 | Howe ................ G06Q 20/4015 705/16 |
| 2013/0325601 A1 | 12/2013 | Shekhawat et al. |
| 2013/0326007 A1 | 12/2013 | Turner et al. |
| 2013/0339186 A1 | 12/2013 | French |
| 2013/0339848 A1 | 12/2013 | Patil et al. |
| 2014/0019542 A1 | 1/2014 | Rao et al. |
| 2014/0032902 A1 | 1/2014 | Agrawal et al. |
| 2014/0095320 A1 | 4/2014 | Sivaramakrishnan et al. |
| 2014/0114821 A1 | 4/2014 | Yoshioka et al. |
| 2014/0120864 A1 | 5/2014 | Manolarakis et al. |
| 2014/0122343 A1 | 5/2014 | Einav et al. |

(56) References Cited

U.S. PATENT DOCUMENTS

| | | | |
|---|---|---|---|
| 2014/0122697 A1 | 5/2014 | Liu et al. | |
| 2014/0129322 A1 | 5/2014 | George et al. | |
| 2014/0148197 A1 | 5/2014 | Shields | |
| 2014/0180802 A1 | 6/2014 | Boal | |
| 2014/0197950 A1 | 7/2014 | Shupp et al. | |
| 2014/0258125 A1 | 9/2014 | Gerber et al. | |
| 2014/0289867 A1 | 9/2014 | Bukai | |
| 2014/0361926 A1 | 12/2014 | Eisen et al. | |
| 2015/0026027 A1 | 1/2015 | Priess et al. | |
| 2015/0039596 A1 | 2/2015 | Stewart | |
| 2015/0046989 A1 | 2/2015 | Oberheide et al. | |
| 2015/0066979 A1 | 3/2015 | Zhang et al. | |
| 2015/0088980 A1 | 3/2015 | Lakes et al. | |
| 2015/0106198 A1 | 4/2015 | Miller et al. | |
| 2015/0106270 A1 | 4/2015 | Burrell et al. | |
| 2015/0120717 A1 | 4/2015 | Kim et al. | |
| 2015/0127825 A1 | 5/2015 | Johannsen | |
| 2015/0142767 A1 | 5/2015 | Wu et al. | |
| 2015/0161207 A1 | 6/2015 | Li et al. | |
| 2015/0186901 A1 | 7/2015 | Miltonberger | |
| 2015/0188897 A1 | 7/2015 | Grigorovici et al. | |
| 2015/0193769 A1 | 7/2015 | Barber | |
| 2015/0193821 A1 | 7/2015 | Izumori et al. | |
| 2015/0235258 A1 | 8/2015 | Shah et al. | |
| 2015/0235275 A1 | 8/2015 | Shah et al. | |
| 2015/0242861 A9 | 8/2015 | Baldassano | |
| 2015/0254658 A1 | 9/2015 | Bondesen et al. | |
| 2015/0294316 A1 | 10/2015 | Eisen | |
| 2015/0326517 A1 | 11/2015 | Block et al. | |
| 2015/0350856 A1 | 12/2015 | Circosta et al. | |
| 2016/0034954 A1 | 2/2016 | Tollinger et al. | |
| 2016/0036782 A1 | 2/2016 | Jeffrey et al. | |
| 2016/0125461 A1 | 5/2016 | Sivaramakrishnan et al. | |
| 2016/0182657 A1 | 6/2016 | Mukherjee et al. | |
| 2016/0188893 A1 | 6/2016 | Ghafourifar | |
| 2016/0246581 A1 | 8/2016 | Jimenez et al. | |
| 2016/0275545 A1 | 9/2016 | Dasdan et al. | |
| 2016/0321701 A1 | 11/2016 | Tollinger et al. | |
| 2017/0039571 A1 | 2/2017 | Eisen | |
| 2017/0053208 A1 | 2/2017 | Krishnamurthy et al. | |
| 2017/0364918 A1 | 12/2017 | Malhotra et al. | |
| 2018/0108029 A1 | 4/2018 | Sinha et al. | |
| 2018/0121915 A1 | 5/2018 | Britton et al. | |
| 2018/0227299 A1 | 8/2018 | Varon et al. | |
| 2019/0340642 A1 | 11/2019 | Barber | |
| 2019/0370859 A1 | 12/2019 | Traasdahl et al. | |
| 2020/0034845 A1 | 1/2020 | Eisen | |
| 2020/0064444 A1 | 2/2020 | Regani et al. | |
| 2020/0092287 A1 | 3/2020 | Cano et al. | |
| 2020/0218763 A1 | 7/2020 | Barber | |
| 2020/0294086 A1 | 9/2020 | Traasdahl et al. | |
| 2021/0326884 A1* | 10/2021 | Douglas | G06Q 30/0253 |
| 2021/0336955 A1 | 10/2021 | Huffman et al. | |
| 2022/0043881 A1 | 2/2022 | Putnam et al. | |
| 2023/0060262 A1* | 3/2023 | Jass | G06Q 20/4016 |
| 2023/0254311 A1 | 8/2023 | Huffman et al. | |
| 2024/0015173 A1 | 1/2024 | Putnam et al. | |
| 2024/0078546 A1 | 3/2024 | Britton et al. | |
| 2024/0089267 A1 | 3/2024 | Eisen | |
| 2024/0422157 A1 | 12/2024 | Eisen | |

FOREIGN PATENT DOCUMENTS

| | | |
|---|---|---|
| EP | 0 645 692 | 3/1995 |
| EP | 0 923 039 | 6/1999 |
| EP | 1 067 792 | 1/2001 |
| EP | 1 209 935 | 5/2002 |
| EP | 1 256 911 | 11/2002 |
| EP | 1 201 070 B1 | 6/2006 |
| EP | 1 703 382 | 9/2006 |
| EP | 1 197 032 B1 | 8/2007 |
| EP | 2 154 891 | 2/2010 |
| EP | 2 323 091 | 5/2011 |
| EP | 3 937 456 | 1/2022 |
| GB | 2 491 101 | 11/2012 |
| GB | 2 492 604 | 1/2013 |
| JP | 05-257602 | 10/1993 |
| JP | 2000-020467 | 1/2000 |
| JP | 2000-099250 | 4/2000 |
| JP | 2000-137755 | 5/2000 |
| JP | 2000-242582 | 9/2000 |
| JP | 2000-276281 | 10/2000 |
| JP | 2002-007697 | 1/2002 |
| JP | 2002-297869 | 10/2002 |
| JP | 2002-304568 | 10/2002 |
| JP | 2003-050910 | 2/2003 |
| JP | 2005-063216 | 3/2005 |
| JP | 2005-115644 | 4/2005 |
| JP | 2005-135431 | 5/2005 |
| JP | 2006-004333 | 1/2006 |
| JP | 2007-018446 | 1/2007 |
| JP | 2007-041642 | 2/2007 |
| JP | 2007-272520 | 10/2007 |
| JP | 2007-282249 | 10/2007 |
| JP | 2008-022298 | 1/2008 |
| JP | 2008-065363 | 3/2008 |
| JP | 2008-171315 | 7/2008 |
| JP | 2008-535062 | 8/2008 |
| JP | 2008-535124 | 8/2008 |
| JP | 2008-242805 | 10/2008 |
| JP | 2008-243008 | 10/2008 |
| JP | 2008-257434 | 10/2008 |
| JP | 2008-269229 | 11/2008 |
| JP | 4202314 | 12/2008 |
| JP | 2009-017298 | 1/2009 |
| JP | 2009-048538 | 3/2009 |
| JP | 2009-512940 | 3/2009 |
| JP | 2009-122880 | 6/2009 |
| JP | 2009-175984 | 8/2009 |
| JP | 2009-271661 | 11/2009 |
| JP | 2010-020728 | 1/2010 |
| JP | 2010-061254 | 3/2010 |
| JP | 2010-122955 | 6/2010 |
| JP | 2010-122956 | 6/2010 |
| JP | 2010-146153 | 7/2010 |
| JP | 2010-225040 | 10/2010 |
| JP | 2010-250664 | 11/2010 |
| JP | 2011-065531 | 3/2011 |
| JP | 2011-134252 | 7/2011 |
| JP | 2011-159264 | 8/2011 |
| JP | 2011-159307 | 8/2011 |
| JP | 2011-524560 | 9/2011 |
| JP | 2011-210263 | 10/2011 |
| JP | 2012-234503 | 11/2012 |
| JP | 5191376 | 5/2013 |
| JP | 5216932 | 6/2013 |
| JP | 2015-503148 | 1/2015 |
| KR | 10-1999-0015738 | 3/1999 |
| KR | 10-0645983 | 11/2006 |
| KR | 10-2008-0044558 | 5/2008 |
| KR | 10-2009-0051977 | 9/2009 |
| KR | 10-2009-0012013 | 5/2010 |
| KR | 10-2010-0085888 | 7/2010 |
| WO | WO 96/041488 | 12/1996 |
| WO | WO 97/003410 | 1/1997 |
| WO | WO 97/023816 | 7/1997 |
| WO | WO 99/050775 | 10/1999 |
| WO | WO 01/011450 | 2/2001 |
| WO | WO 01/033520 | 5/2001 |
| WO | WO 01/086877 | 11/2001 |
| WO | WO 01/095550 | 12/2001 |
| WO | WO 01/097134 | 12/2001 |
| WO | WO 02/001462 | 1/2002 |
| WO | WO 02/071176 | 9/2002 |
| WO | WO 02/091226 | 11/2002 |
| WO | WO 03/017155 | 2/2003 |
| WO | WO 03/025868 | 3/2003 |
| WO | WO 03/075197 | 9/2003 |
| WO | WO 02/037219 A9 | 5/2004 |
| WO | WO 2004/038997 | 5/2004 |
| WO | WO 2005/038818 | 4/2005 |
| WO | WO 2005/099166 | 10/2005 |
| WO | WO 2006/135367 | 12/2006 |
| WO | WO 2007/001394 | 1/2007 |

(56) References Cited

FOREIGN PATENT DOCUMENTS

| | | |
|---|---|---|
| WO | WO 2007/045818 | 4/2007 |
| WO | WO 2007/072238 | 6/2007 |
| WO | WO 2007/075573 | 7/2007 |
| WO | WO 2008/029828 | 3/2008 |
| WO | WO 2008/054849 | 5/2008 |
| WO | WO 2009/132148 | 10/2009 |
| WO | WO 2011/081818 | 7/2011 |
| WO | WO 2011/104864 | 9/2011 |
| WO | WO 2012/054646 | 4/2012 |
| WO | WO 2012/061801 | 5/2012 |
| WO | WO 2012/142121 | 10/2012 |
| WO | WO 2012/142584 | 10/2012 |
| WO | WO 2013/006538 | 1/2013 |
| WO | WO 2013/070687 | 5/2013 |
| WO | WO 2013/074750 | 5/2013 |
| WO | WO 2013/142722 | 9/2013 |
| WO | WO 2014/022813 | 2/2014 |
| WO | WO 2017/040799 | 3/2017 |
| WO | WO 2018/129373 | 7/2018 |
| WO | WO 2022/104341 | 5/2022 |

OTHER PUBLICATIONS

Bharosa, "Bharosa Authenticator", http://www.bharosa.com/authenticator.html, Jan. 18, 2007, pp. 3.
Bharosa, "Bharosa Announces Online Authentication Solution to Counter Check 21-Based Fraud", http://www.bharosa.com/news/PR-110705.html, Jan. 18, 2007, pp. 2.
Bourobou et al., "User Activity Recognition in Smart Homes Using Pattern Clustering Applied to Temporal ANN Algorithm", Sensors, May 21, 2015, vol. 15, pp. 11953-11971.
Broenink, Ralph, "Using Browser Properties for Fingerprinting Purposes", 16th Biennial Twente Student Conference on IT, Enschede, Holanda, Jan. 2012, pp. 8.
Darlin, Damon, "Opening the Door on the Credit Report and Throwing Away the Lock", http://www.nytimes.com/2006/03/18/business/yourmoney/18money.html, The New York Times, Saturday Mar. 18, 2006, pp. 2.
Derfler, Jr. et al., "How Networks Work", Millennium Edition, Que Corporation, Indianapolis, IN, Sep. 2000, pp. 230.
Eckersley, Peter, "How Unique Is Your Web Browser?", Electronic Frontier Foundation, 2010, pp. 19.
Elkhodr et al., "A Review of Mobile Location Privacy in the Internet of Things", 2012 Tenth International Conference on ICT and Knowledge Engineering, 2012, pp. 266-272.
Faulkner, Alisdair, "Fraud Network Whitepaper", ThreatMetrix, Whitepaper, 2010, pp. 16.
Gralla, Preston, "How the Internet Works", Millennium Edition, Que Corporation, Indianapolis, IN, Aug. 1999, pp. 329.
Gueye et al., "Constraint-Based Geolocation of Internet Hosts", ACM Internet Measurement Conference 2004, Oct. 25-27, 2004, Taormina, Sicily, Italy, vol. 14, No. 6, pp. 288-293.
"ISO 8583", Wikipedia, http://en.wikipedia.org/wiki/ISO_8583, dated Apr. 13, 2015 in 14 pages.
Kisel et al., "Utilizing a Personalization-Enabled Access Node in Support of the Converged Cross-Domain Scoring and Advertising", Bell Labs Technical Journal, 2010, vol. 15, No. 1, pp. 77-94.
Kohno et al., "Remote Physical Device Fingerprinting", Proceedings of 2005 IEEE Symposium on Security and Privacy, May 8-11, 2005, Oakland, CA, pp. 211-225.
Manavoglu et al., "Probabilistic User Behavior Models", ICDM, Third IEEE International Conference on Data Mining, Nov. 19-22, 2003, pp. 203-210.
Marshall, Jack, "Device Fingerprinting Could Be Cookie Killer", ClickZ. Mar. 2, 2011, pp. 7. http://www.clickz.com/clickz/news/2030243/device-fingerprinting-cookie-killer.
Quora, [No Author Listed], How does a tracking pixel work? by Quora, 2011.
Schmücker, Niklas, "Web Tracking", SNET2 Seminar Paper—Summer Term 2011, Berlin University of Technology, pp 12.
Shabtai et al., "'Andromaly': A Behavioral Malware Detection Framework for Android Devices", Journal of Intelligent Information Systems, 2012, vol. 38, pp. 161-190.
Techweb, "Wells Fargo Intros Anti-Theft Alerts", http://www.techweb.com/wire/166404177, Aug. 1, 2005, pp. 1.
The Knightmare, "Secrets of a Super Hacker", Loompanics Unlimited, Port Townsend, Washington, 1994, pp. 233.
"UPIC Marketing Guide—The Clearing House", http://www.upic.com/infofiles/UPIC_Marketing_Guide.pdf, as printed Dec. 19, 2006. pp. 1-16.
White, Ron, "How Computers Work", Millennium Edition, Que Corporation, Indianapolis, IN, Sep. 1999, pp. 284.
Official Communication in European Patent Application No. 05818903.6, dated Dec. 23, 2011.
Official Communication in European Patent Application No. 05818903.6, dated Mar. 18, 2014.
Official Communication in European Patent Application No. 05818903.6, dated Jul. 18, 2017.
Official Communication in European Patent Application No. 19189189.4, dated Jan. 21, 2020.
Official Communication in European Patent Application No. 19189189.4, dated Nov. 19, 2020.
International Search Report and Written Opinion for Application No. PCT/US2005/035532, dated Oct. 29, 2007.
International Preliminary Report on Patentability and Written Opinion for Application No. PCT/US2005/035532, dated Jan. 9, 2008.
Official Communication in European Patent Application No. 6845722.5, dated Mar. 13, 2009.
Official Communication in European Patent Application No. 19181057.1, dated Sep. 17, 2019.
Official Communication in European Patent Application No. 19181057.1, dated Oct. 25, 2021.
Official Communication in European Patent Application No. 8159110.9, dated Oct. 27, 2008.
Official Communication in European Patent Application No. 8159110.9, dated Mar. 22, 2010.
Summons to Attend Oral Proceedings received in European Application No. EP08159110, dated Jul. 23, 2020.
International Search Report and Written Opinion for Application No. PCT/US2006/048251, dated Feb. 26, 2008.
International Preliminary Report on Patentability and Written Opinion for Application No. PCT/US2006/048251, dated Jun. 18, 2008.
International Search Report and Written Opinion for Application No. PCT/US2007/065776, dated Jul. 3, 2008.
International Preliminary Report on Patentability and Written Opinion for Application No. PCT/US2007/065776, dated Sep. 30, 2008.
International Search Report and Written Opinion received in PCT Application No. PCT/US2005/020750, dated Jun. 13, 2008.
International Preliminary Report on Patentability and Written Opinion received in PCT Application No. PCT/US2005/020750, dated Jul. 1, 2008.
Official Communication in European Patent Application No. 08165224.0, dated Nov. 15, 2010.
Supplementary European Search Report for Application No. EP09735653, dated Dec. 28, 2011.
Official Communication for Application No. EP09735653, dated Jan. 4, 2013.
Summons to Attend Oral Proceedings received in European Application No. EP09735653, dated Oct. 7, 2016.
International Search Report and Written Opinion for Application No. PCT/US2009/041462, dated Dec. 1, 2009.
International Preliminary Report on Patentability and Written Opinion for Application No. PCT/US2009/041462, dated Nov. 4, 2010.
International Search Report and Written Opinion for Application No. PCT/US2011/056948, dated Apr. 18, 2012.
International Preliminary Report on Patentability in Application No. PCT/US2011/056948, dated May 2, 2013.
International Search Report and Written Opinion for Application No. PCT/US2013/033357, dated Jul. 10, 2013.
International Preliminary Report on Patentability in Application No. PCT/US2013/033357, dated Sep. 23, 2014.
International Search Report and Written Opinion for Application No. PCT/US2013/053495, dated Nov. 22, 2013.

(56) References Cited

OTHER PUBLICATIONS

International Preliminary Report on Patentability in Application No. PCT/US2013/053495, dated Feb. 3, 2015.
International Search Report and Written Opinion for Application No. PCT/US2013/070146, dated Mar. 3, 2014.
International Preliminary Report on Patentability in Application No. PCT/US2013/070146, dated May 28, 2015.
Official Communication received in European Patent Application No. 16766741.9, dated Aug. 20, 2019.
Summons to Attend received in European Patent Application No. 16766741.9, dated Mar. 25, 2020.
Official Communication received in European Patent Application No. 21154719.5, dated Jun. 15, 2021.
International Search Report and Written Opinion for Application No. PCT/US2012/065220, dated Mar. 21, 2013.
International Preliminary Report on Patentability in Application No. PCT/US2012/065220, dated May 30, 2014.
International Search Report and Written Opinion for Application No. PCT/US2016/049930, dated Nov. 9, 2016.
Provisional Application as filed in U.S. Appl. No. 61/324,312, dated Apr. 15, 2010 in 15 pages.
Fawcett et al., "Adaptive Fraud Detection", Data Mining and Knowledge Discovery 1, 1997, pp. 291-316.

\* cited by examiner

DERIVATIVE LOCATOR(N)

| CREDIT CARD # | TRANSACTION AMOUNT |
|---|---|
| | |

| TIMESTAMP (TN) |
|---|

REPOSITORY

| DERIVATIVE LOCATOR | TIME | DEVICE, TRANSACTION, AND/OR OTHER RECORDS |
|---|---|---|
| DL1 | T1 | |
| DL2 | T2 | |
| DL3 | T3 | |
| DL4 | T4 | |
| DL5 | T5 | |
| . | . | . |
| . | . | . |
| . | . | . |

FIG. 3

SYSTEMS AND METHODS FOR ACCESSING RECORDS VIA DERIVATIVE LOCATORS

CROSS REFERENCE

This application is a continuation application of U.S. application Ser. No. 17/654,353, filed Mar. 10, 2022, entitled SYSTEMS AND METHODS FOR ACCESSING RECORDS VIA DERIVATIVE LOCATORS, which is a continuation application of U.S. application Ser. No. 16/532,228, filed Aug. 5, 2019, entitled SYSTEMS AND METHODS FOR ACCESSING RECORDS VIA DERIVATIVE LOCATORS, now U.S. Pat. No. 11,301,860, which is a continuation application of U.S. application Ser. No. 14/609,388, filed on Jan. 29, 2015, entitled SYSTEMS AND METHODS FOR ACCESSING RECORDS VIA DERIVATIVE LOCATORS, now U.S. Pat. No. 10,417,637, which is a continuation of PCT/US2013/053495, filed on Aug. 2, 2013, entitled SYSTEMS AND METHODS FOR ACCESSING RECORDS VIA DERIVATIVE LOCATORS, which claims the benefit of U.S. Provisional Application No. 61/679,048 filed Aug. 2, 2012, entitled SYSTEMS AND METHODS FOR ACCESSING RECORDS VIA DERIVATIVE LOCATORS, U.S. Provisional Application No. 61/704,320 filed Sep. 21, 2012, entitled SYSTEMS AND METHODS FOR ACCESSING RECORDS VIA DERIVATIVE LOCATORS, and U.S. Provisional Application No. 61/728,713, filed Nov. 20, 2012, entitled SYSTEMS AND METHODS FOR ACCESSING RECORDS VIA DERIVATIVE LOCATORS, where all above-cited patents and applications are hereby incorporated herein by reference in their entireties.

BACKGROUND OF THE INVENTION

In a commercial transaction, such as an ecommerce transaction, a consumer provides a merchant with several data points. An authorization message is typically sent to a card network and the transaction is routed to an issuer for response. However, there exists a risk of fraudulent transactions.

Challenges remain in detecting these fraudulent transactions. A need exists to provide access to information that may aid in detection of fraudulent transactions.

SUMMARY OF THE INVENTION

The invention provides systems and methods for accessing information via derivative locators. Various aspects of the invention described herein may be applied to any of the particular applications set forth below. The invention may be applied as a standalone financial transaction or ecommerce system or as a component of an integrated fraud detection system or solution. The invention can be optionally integrated into existing business and processes seamlessly, for example, with financial transaction verification parties and flow. It shall be understood that different aspects of the invention can be appreciated individually, collectively or in combination with each other.

An aspect of the invention is directed to a method of accessing records from a repository. The method may comprise receiving transaction information for an open transaction; formulating, with aid of a processor, a derivative locator based on the received transaction information; searching the repository for index information corresponding to the derivative locator; and receiving records from the repository corresponding to the index information. The derivative locator may be formulated based on a credit card number used in the open transaction and a transaction amount from the open transaction. The method may further comprise capturing a request timestamp after receiving the transaction information and prior to searching the repository; and comparing, with aid of a processor, the request timestamp with a stored timestamp in the repository corresponding to the index information.

Aspects of the invention may be directed to a method of approving or not approving a transaction between a user device and a merchant comprising: receiving a derivative locator, wherein said derivative locator is formulated based on transaction information between the user device and the merchant; providing the derivative locator to a repository as an index to the repository; receiving records from the repository corresponding to the index of the repository; determining, with aid of a processor, whether to approve or not approve the transaction based on the records received from the repository; and providing an indicator to approve or not approve the transaction based on the records received from the repository.

An additional aspect of the invention may include a system for accessing records from a repository comprising: a user interface which may accept input relating to an online transaction; a processor configured to formulate a derivative locator based on information about the transaction; and a repository comprising a memory for storing records regarding a user or user device, wherein the records are accessible via an index corresponding to the derivative locator.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 3 shows an example of a derivative locator used to access information a repository.

DETAILED DESCRIPTION OF THE INVENTION

In the following detailed description, numerous specific details are set forth in order to provide a thorough understanding of the invention. However it will be understood by those of ordinary skill in the art that the invention may be practiced without these specific details. In other instances, well-known methods, procedures, components and circuits have not been described in detail so as not to obscure the invention. Various modifications to the described embodiments will be apparent to those with skill in the art, and the general principles defined herein may be applied to other embodiments. The invention is not intended to be limited to the particular embodiments shown and described.

Figure 1:
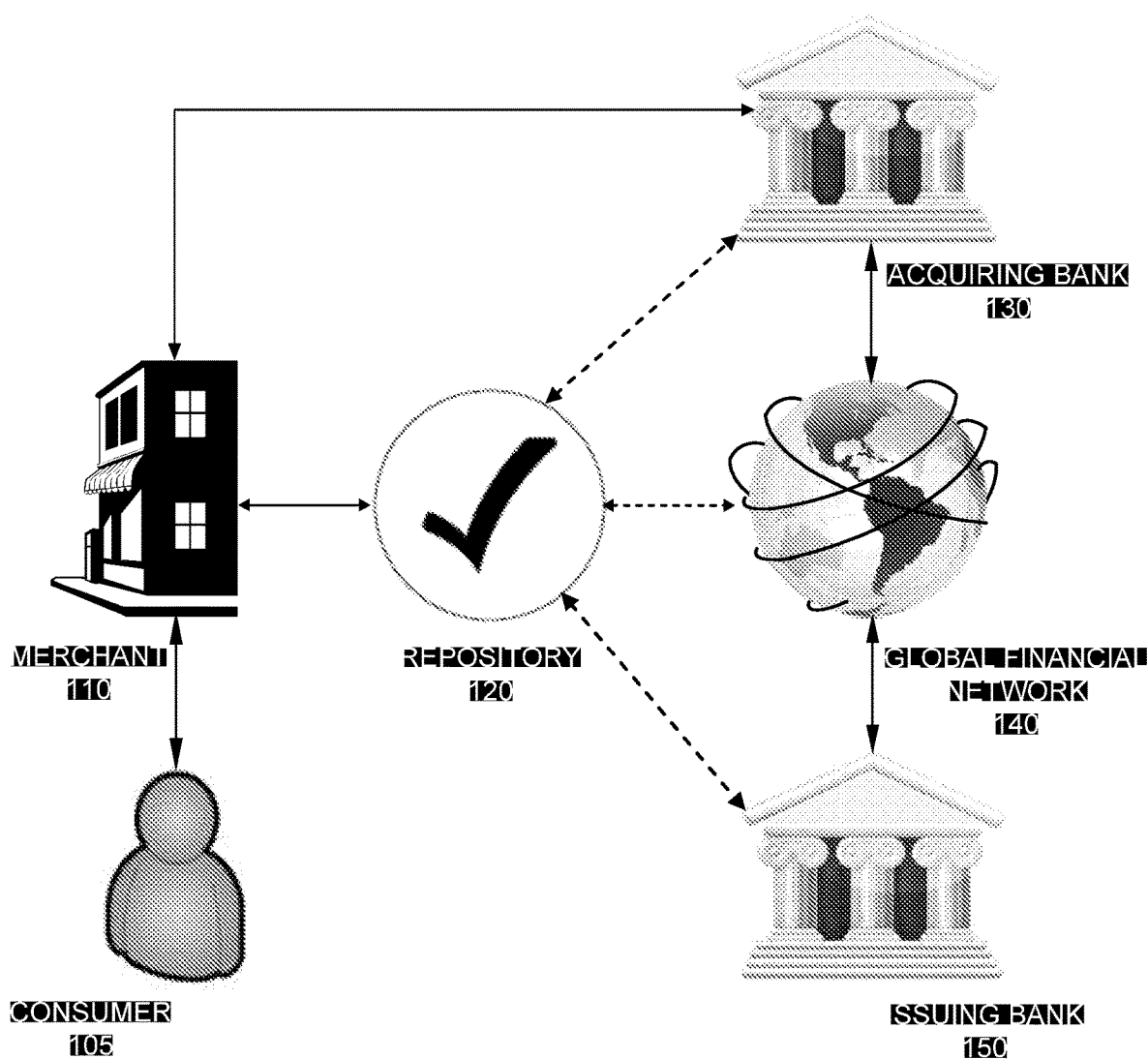
FIG. 1 shows an example of a records access system provided in accordance with an embodiment of the invention.

FIG. 1 shows an example of a records access system provided in accordance with an embodiment of the invention. A consumer 105 may interact with a merchant 110. The merchant may send information about the transaction, and/or a device used by the consumer to a repository 120. The merchant may also send information about the transaction and/or the device to an acquiring bank 130. The acquiring bank may send information about the transaction to a global financial network 140 (e.g., card network). The global financial network may send information about the transaction to an issuing bank 150. The acquiring bank, global financial network, and/or issuing bank may be capable of communicating with the repository. In some embodiments, additional or alternative entities may be involved in the communications and sharing of transaction information. Any of the additional or alternative entities may be capable of communicating with the repository. The acquiring bank, global financial network, and/or issuing bank may access information in the repository using a derivative locator. The derivative locator may be determined based on information provided to the acquiring bank, global financial network, and/or issuing bank within a normal pipeline for financial services.

Figure 2:
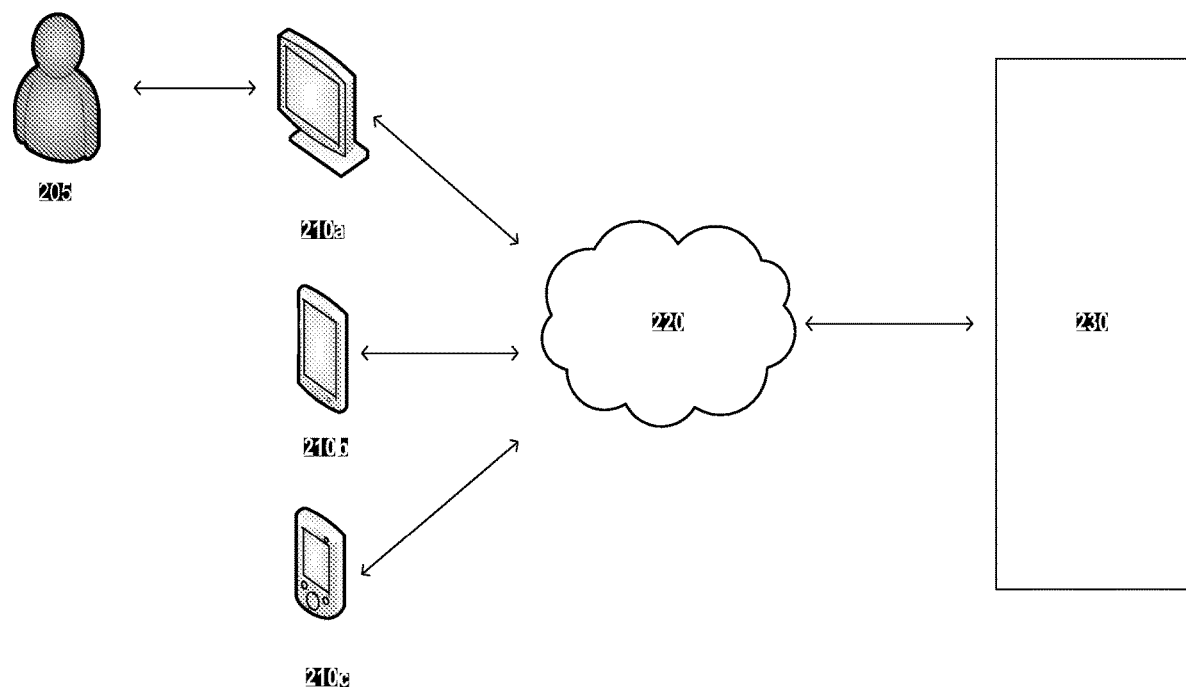
FIG. 2 provides an example of a portion of an information access system through which users may interact with the system.

A consumer 105 may interact with a merchant 110. In some embodiments, a consumer may interact with a merchant via one or more device. FIG. 2 provides a further example of how a user, such as a consumer, may interact with a member of the system, such as a merchant. The merchant may have an electronic storefront, and a consumer may be purchasing one or more item online. For example, the electronic storefront may be provided on a website. The device may use a browser or application to permit the consumer to view the electronic storefront. The item may include goods, and/or services. A financial transaction may occur between a consumer and the merchant. The financial transaction may be an online transaction. Any description of a merchant may apply to any provider of goods or services, or party involved in a financial transaction with the consumer. A consumer may be an individual, an entity (e.g., company, corporation, organization), and/or an individual associated with the entity.

The consumer may interact with the merchant by providing a information about the consumer's payment methods. For example, the consumer may provide a credit card number, debit card number, gift card number, coupon number, certificate number, or any other type of payment information.

The consumer 105 may indicate which goods or services are being purchased from the merchant 110. The consumer may utilize the consumer's device and a user interface of the device to select the items for purchase and/or specify information about the financial transaction. In other embodiments, the consumer may be providing finances to the merchant without necessarily buying something (e.g., donation, transfer). Once the consumer is prepared to complete the transaction, the consumer may select a checkout option, or other comparable option.

The merchant 110 may provide information about the transaction and/or device to a repository 120, or alternatively the repository may collect the information from the consumer directly, on behalf of the merchant. In some instances, the repository may receive information directly from the consumer's device. Any description herein of information that is provided to the repository can originate from the merchant, from the consumer, from the consumer's device, or from any third party source. The information provided to the repository may include pre-analyzed information or may include raw information that the repository may analyze, or any combination thereof. The repository may be used to aggregate information and/or analyze the information. In some instances, the repository may analyze information to determine a reputation for a user and/or device. The repository may be used to determine the likelihood of fraud for a particular transaction, or the likely fraudulent user or device.

Transaction information may include personal information about the consumer, specifics about the transaction, and/or information about the device. For example, information about the device used by the consumer may be collected via the merchant or any intermediary third party. In one example, the device may have a local clock that may indicate a time for the device at any point in the transaction. For example, the time according to the clock of the device upon checkout may be collected. The time according to the clock when the consumer selects an option to initiate the checkout may be collected. The time according to the clock when other information relating to the transaction is sent may be collected and sent. The time according to the clock may be collected at one, two, or more points during the transaction. Time zone information about the device may be collected. This may include daylight savings time information. The time of the device relative to a standardized time (e.g., UTC time) may be collected. In some instances an IP address of the device may be collected. Any additional information about the device and/or configuration of the device may be collected. The merchant may provide this information to a central repository.

The merchant may optionally provide merchant data or pre-process the device data and send such information to the repository. For example, the merchant server may have a clock. The difference in time between the device clock and the merchant server clock may be calculated, thereby providing a time difference parameter. The time difference parameter may be sent to the repository. In some embodiments, the repository may have a server or other device which may have a clock. The difference in time between the device clock and the repository clock may be calculated, thereby providing a time difference parameter. In other embodiments, the difference in time may be calculated between the device clock and any reference clock. The reference clock can be a third party clock. The reference clock may be directed to any time zone which may be the same time zone as the device clock or different from the device clock time zone. The reference clock may be synchronized with UTC time. A time difference parameter may be calculated between the device clock and any reference clock. The time difference parameter may be provided to the repository. The time difference parameter may be provided by the device, the merchant server, or any third party. Alternatively, information to calculate the time difference parameter may be provided to the repository, which may perform the time difference calculation and derive the time difference parameter.

Information about the transaction may be provided to the central repository. For example, user information may be provided, such as a user's name, address, telephone number, email, date of birth, credit card number, credit card expiration date. Additional transaction information may be provided, such as items (e.g., goods or services) purchased, the transaction amount, taxes/fees, shipping, promotions/discounts, transaction breakdown, time of transaction, or any other information.

Figure 5:
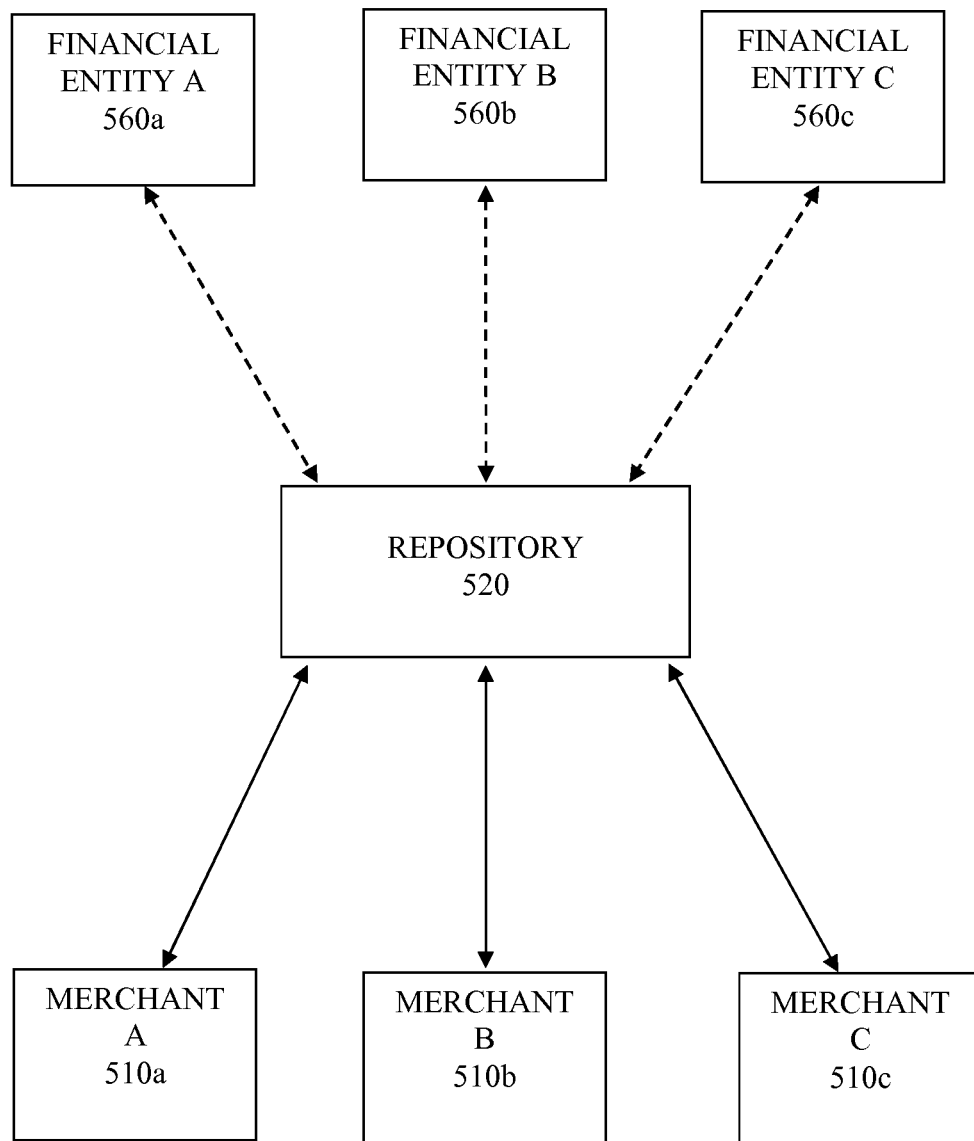
FIG. 5 shows an example of a records repository communicating with multiple sources in accordance with an embodiment of the invention.

Such information may be stored in the repository 120. Information from the merchant 110 across multiple transactions may be stored in the repository. The repository may receive information from one or multiple merchants. The repository may receive information from additional data sources or parties, which may or may not include acquiring banks, global financial networks, and/or issuing banks. FIG. 5 provides an example of a repository that may be in communication with multiple entities, to be described in greater detail elsewhere herein. The repository may be a central location at which information about devices, transactions, users, or any other related information may be deposited and/or accessed. Information may be aggregated from a single or multiple sources over time. Such information may or may not include indication of a likelihood of a fraudulent device, user, transaction and/or may associate one or more device, user, and/or credit card, with a fraudulent transaction. Some of the data in the central repository may be pre-analyzed to provide an indicator or likelihood of fraud or provide an identity. In some instances, one or more calculation may be made using the raw data. Alternatively, such information may include raw data that the querying party (e.g., acquiring bank, global financial network, and/or issuing bank) may utilize to determine a likelihood of fraud or provide an indicator of identity. Some information may be used to determine a user and/or device reputation, which may include a good, bad, or neutral reputation. Such determination may be made by the repository. The repository may analyze aggregated information to determine reputation. The reputation may provide insight into how much a user and/or device can be trusted. In some instances, the reputation analysis may yield a reputation score (e.g., numerical value, letter grade, or any other measurement). For example, a reputation score may have a numeral value falling within a range (e.g., 1 to 10, 0 to 100) or a letter grade (e.g., A, B, C, D, E, . . . ). An increased score may be provided for users who regularly use the same devices. Information may be associated (e.g., in pairs or groups) and the score may depend on the number of times the associated information is seen together, or how long the associated information has been together. Alternatively, raw information may be provided to a querying party who may use the information to make a reputation determination.

One or more memory storage devices may be provided at a repository 120. A repository may include a single server or a plurality of servers. A repository may include a single database or a plurality of databases. Processing and/or memory storage units may be centralized and/or distributed. In some instances, a cloud computing infrastructure may be provided for the repository. In some instances, the repository may be owned and/or operated by a single entity. Alternatively, the repository may be owned and/or operated by a plurality of entities which may be in communication with one another and/or pooling resources. The repository may be accessible via a network (e.g., local area network (LAN), wide area network (WAN) such as the Internet, telecommunications network, cellular network, data network, or any other type of network).

The merchant 110 may provide information about the transaction to an acquiring bank 130. Such information may be provided concurrently with, subsequent to, or prior to providing information to the repository 120.

The acquiring bank 130 may be the merchant's bank. The acquiring bank may hold an account for the merchant, and may receive funds at the account. The acquiring bank may receive funds from an issuing bank (e.g., directly or indirectly). The information provided to the acquiring bank may be a subset of the information provided to the repository. Less information and/or some different information may be provided to the acquiring bank than the repository. Some of the information may be provided to both the acquiring bank and the repository. In some instances, the information provided to the acquiring bank may be information provided in a normal pipeline of financial transaction verification. For example, the information may include credit card number, credit card expiration date, name on the credit card, transaction amount, and/or items that were ordered. Such information need not include any specialized index or record locator in addition to the normal information that is provided in the course of financial transaction verification. Such information need not include any specialized device identification information. In some instances, funds transactions reports and/or chargeback reports may be provided between the merchant and the acquiring bank. Such reports may include any of the information described herein.

The acquiring bank 130 may provide information about the transaction to a global financial network 140. The global financial network may be a card network, such as VISA, Mastercard, AMEX, Discover, Diners, etc. The information provided to the global financial network may be a subset of the information provided to the repository 120 and/or the acquiring bank. Less information and/or some different information may be provided to the global financial network than the repository and/or the acquiring bank. Some of the information may be provided to both the global financial network and the acquiring bank. In some instances, the information provided to the global financial network may be information provided in a normal pipeline of financial transaction verification. For example, the information may include credit card number, credit card expiration date, name on the credit card, and/or transaction amount, like in ISO 8583 protocol, see e.g., http://en.wikipedia.org/wiki/ISO_8583 which is hereby incorporated by reference in its entirety. Such information need not include any specialized index or record locator that was shared with the merchant at the moment the transaction initiated, in addition to the normal information that is provided in the course of financial transaction verification. Such information need not include any specialized device identification information. After the merchant initiated an authorization request, and it may traverse the system, via acquiring bank, global network, issuing bank and all the way back-a record locator may be created and shared by all parties. However, this payment network record locator need not be present at the beginning of the transaction. In some instances, settlement files may be transferred between the acquiring bank and the global financial network. The settlement files may include the information described herein.

The global financial network 140 may provide information about the transaction to an issuing bank 150. The issuing bank may be the consumer's credit card bank. The issuing bank may be an institution for the consumer's payment method (e.g., credit card, debit card, gift card, etc.). The issuing bank may have funds retrieved therefrom, and sent to an acquiring bank (e.g., directly or indirectly). The consumer may have an account at the issuing bank, which may transfer funds from the account. The funds may be transferred from the consumer's account at the issuing bank to the merchant's account at the acquiring bank. The information provided to the issuing bank may be a subset of the information provided to the repository 120 and/or the global financial network. Less information and/or some different information may be provided to the issuing bank than the repository and/or the global financial network. Some of the information may be provided to both the issuing bank and the global financial network. In some instances, the information provided to the issuing bank may be information provided in a normal pipeline of financial transaction verification. For example, the information may include credit card number, credit card expiration date, name on the credit card, and/or transaction amount. Such information need not include any specialized index or record locator in addition to the normal information that is provided in the course of financial transaction verification. Such information need not include any specialized device identification information. In some instances, settlement files may be transferred between the global financial network and the issuing bank. The settlement files may include the information described herein.

In some instances, an issuing bank may ultimately send a billing statement to a consumer.

A derivative locator may be determined based on information provided in the normal pipeline of financial transaction verification. Additional embodiments or details relating to the derivative record locator may be provided in FIG. 3 or elsewhere herein. In one example, a derivative locator may be formed based on a consumer's credit card information (e.g., credit card number) and transaction amount (e.g., dollar amount, Euro amount, other currency amount). The derivative record locator may be the credit card number and transaction amount appended together. For example, the derivative record locator may be a concatenation of the credit card number and transaction amount. In other embodiments, a hash string or other identifier may be calculated or derived based on the credit card number only and the transaction amount will remain in the clear, and/or hashed separately (e.g., may or may not concatenated with the credit card).

The derivative locator may be used as an index to access one or more records in a repository. For example, transaction records, which may include device records may be stored in the repository and may be associated with an index corresponding to the derivative locator (e.g., credit card number+ transaction amount). The records may be searched for a corresponding index (e.g., corresponding credit card number+transaction amount), and associated information may be accessed and/or pulled. Such associated information may be associated with the present transaction, user and/or the device used for the transaction. Associated information may also include analyzed information relating to the transaction, user and/or the device. Such analyzed information may include an indication of a likelihood of fraud and/or reputation information.

A time component may be provided. For example, the time when the request is made to access the repository records may be determined. A timestamp may be taken. The timestamp may be based on a clock of the requesting party (e.g., issuing bank, global financial network, and/or acquiring bank). The timestamp may be based on a clock of the repository and/or the merchant. The timestamp may be taken at a time a derivative locator is formed. The timestamp may be associated with the derivative locator. Alternatively, as the speed of the transaction in a real-time system is fast, when any party requests information from the repository, using the derivative locator—the look-back window to search for such a transaction can be limited to a short amount of time from "now", or the moment the repository receives the data request. This allows the time look-back to be dynamic, removing the need to send specific timestamps in the authorization message.

The timestamp may be compared to one or more timestamp provided in the records. For example, the time that a consumer selects a checkout option and/or sends information to the repository, one or more timestamp may be taken and/or stored in the repository. The new timestamp may be compared to the time data stored in the repository. If the difference between the new timestamp and the original timestamp does not exceed a threshold amount, then a transaction in the repository may be determined to be corresponding. Any time difference threshold may be selected or predetermined. For example, the difference between the look-up time and the repository record creation and/or check out may be less than or equal to about 1 minute, 30 seconds, 15 seconds, 10 seconds, 8 seconds, 5 seconds, 3 seconds, 2 seconds, 1 second, 0.5 seconds, or 0.1 seconds.

The time threshold comparison may be useful in situations where multiple transactions have been provided for a credit card, wherein the transaction amounts are substantially the same amount. The time threshold may provide an increased likelihood that the derivative locator is a unique identifier of a record in the repository corresponding to the particular threshold.

A derivative locator may be formed and/or timestamp may be taken at one or multiple points in the process. For example, the issuing bank 150 may attempt to access information in the repository 120. The issuing bank may form the derivative locator based on information available to the issuing bank. For example, the issuing bank may form a derivative locator based on the credit card number and transaction amount. A timestamp may be taken. The issuing bank may use the derivative locator to access information associated in the repository associated with the corresponding derivative locator. The timestamp may be compared to one or more indicator of the time that a record in the repository was created. If the look-up timestamp is recent enough, the likelihood that the derivative locator corresponds to the record created for the same transaction is very high or increased. The issuing bank may review the information from the data repository. The information from the data repository may include an indicator of a likelihood of fraud, or may be analyzed by the issuing bank to determine a likelihood of fraud. The information from the data repository may include an indicator of device and/or user reputation, or be analyzed by the issuing bank to determine the device and/or user reputation. Reputation information may or may not be used in the determination of likelihood of fraud, and vice versa. The issuing bank may make a determination whether to accept or decline the financial transaction, based at least partially on information provided by the repository. For example if information from the repository indicates suspicious behavior or a low reputation, the issuing bank may decide to decline the financial transaction. The issuing bank may make the determination in an automated fashion with aid of a processor, without requiring human intervention. Alternatively, the bank may include one or more users reviewing information and assisting with the determination. The indication of whether the issuing bank accepts or declines the transaction may be sent to the global financial network, which may pass it on to the acquiring bank, which may relay it to the merchant. The merchant interface may display to the consumer whether the transaction was accepted or declined. In some instances, the consumer may be prompted for additional information that may be required in order for the transaction to proceed.

In some instances, the derivative locator and/or timestamp may be taken via the global financial network 140. For example, the global financial network may attempt to access information in the repository 120. The global financial network may form the derivative locator based on information available to the global financial network. For example, the global financial network may form a derivative locator based on the credit card number and transaction amount. A timestamp may be taken. The global financial network may use the derivative locator to access information associated in the repository associated with the corresponding derivative locator. The timestamp may be compared to one or more indicator of the time that a record in the repository was created. If the look-up timestamp is recent enough, the likelihood that the derivative locator corresponds to the record created for the same transaction is very high or increased. The global financial network may review the information from the data repository. The information from the data repository may include an indicator of a likelihood of fraud, or may be analyzed by the global financial network to determine a likelihood of fraud. The information from the data repository may include an indicator of device and/or user reputation, or be analyzed by the global financial network to determine the device and/or user reputation. Reputation information may or may not be used in the determination of likelihood of fraud, and vice versa. The global financial network may make a determination whether to accept or decline the financial transaction, based at least partially on information provided by the repository. For example if information from the repository indicates suspicious behavior, the global financial network may decide to decline the financial transaction. The global financial network may make the determination in an automated fashion with aid of a processor, without requiring human intervention. Alternatively, the global financial network may include one or more users reviewing information and assisting with the determination. The indication of whether the global financial network accepts or declines the transaction may be sent to the acquiring bank, which may relay it to the merchant. The merchant interface may display to the consumer whether the transaction was accepted or declined. In some instances, the consumer may be prompted for additional information that may be required in order for the transaction to proceed.

Additionally or alternatively, the derivative locator and/or timestamp may be taken via the acquiring bank 130. For example, the acquiring bank may attempt to access information in the repository 120. The acquiring bank may form the derivative locator based on information available to the acquiring bank. For example, the acquiring bank may form a derivative locator based on the credit card number and transaction amount. A timestamp may be taken. The acquiring bank may use the derivative locator to access information associated in the repository associated with the corresponding derivative locator. The timestamp may be compared to one or more indicator of the time that a record in the repository was created. If the look-up timestamp is recent enough, the likelihood that the derivative locator corresponds to the record created for the same transaction is very high or increased. The acquiring bank may review the information from the data repository. The information from the data repository may include an indicator of a likelihood of fraud, or may be analyzed by the acquiring bank to determine a likelihood of fraud. The information from the data repository may include an indicator of device and/or user reputation, or be analyzed by the acquiring bank to determine the device and/or user reputation. Reputation information may or may not be used in the determination of likelihood of fraud, and vice versa. The acquiring bank may make a determination whether to accept or decline the financial transaction, based at least partially on information provided by the repository. For example if information from the repository indicates suspicious behavior, the acquiring bank may decide to decline the financial transaction. The acquiring bank may make the determination in an automated fashion with aid of a processor, without requiring human intervention. Alternatively, the acquiring bank may include one or more users reviewing information and assisting with the determination. The indication of whether the global acquiring bank accepts or declines the transaction may be sent to the merchant. The merchant interface may display to the consumer whether the transaction was accepted or declined. In some instances, the consumer may be prompted for additional information that may be required in order for the transaction to proceed.

Thus, one, two, three or more of the acquiring bank 130, global financial network 140, or issuing bank 150 may access the repository 120. The acquiring bank 130, global financial network 140, and/or issuing bank 150 may provide a derivative locator to access the repository. The derivate locators may be the same between the acquiring bank, global financial network, and/or the issuing bank. The derivative locator may be unique or pseudo-unique and provide the desired lookup.

FIG. 2 provides an example of a portion of an information access system through which users may interact with the system. One or more devices 210*a*, 210*b*, 210*c* may be in communication with one or more servers 230 of the information access system over a network 220.

One or more user 205 may be capable of interacting with the system via a device 210*a*, 210*b*, 210*c*. In some embodiments, the user may be a consumer. The user may be an individual attempting to initiate a financial transaction. The user may be attempting to purchase goods or services online. The user may use a credit card, debit card, pre-paid card, gift card, bank routing number, or other type of financial payment techniques or instruments.

The device may be a computer 210*a*, laptop, or mobile device (e.g., tablet 210*b*, smartphone 210*c*, cell phone, personal digital assistant) or any other type of device. The device may be a networked device. The device may have a memory, processor, and/or display. The memory may be capable of storing persistent and/or transient data. Those persistent and/or transient data may be stored in the cloud. Non-transitory computer readable media containing code, logic, or instructions for one or more steps described herein may be stored in memory. The processor may be capable of carrying out one or more steps described herein. For example, the processor may be capable of executing the non-transitory computer readable media. A display may show data and/or permit user interaction. For example, the display may include a screen, such as a touchscreen, through which the user may be able to view content. The display may be capable of displaying images (e.g., still or video), text. The device may be capable of providing audio content. The display may include a user interface capable of displaying a web browser or application. For example, the device may display a merchant website through which a user may purchase goods or services.

The device may be able to receive an input from a user. For example, a device may have or accept input from a computer, mouse, joystick, trackball, pointer, pen, microphone, motion sensor, optical sensor, infrared sensor, capacitive sensor, pressure sensor, camera, touchscreen, or any other input device. The user may be able to enter information relating to a transaction via any input device.

The device may have a clock or other timekeeping device. The device clock may indicate a time for the device, which may or may not correspond to an objective time for a location of the device. The device clock may or may not be synchronized with other clocks. The device may have an Internet Protocol (IP) address.

The device 210a, 210b, 210c may be capable of communicating with a server 230. Any description of a server may apply to one or more servers and/or databases. The one or more servers may include a memory and/or programmable processor. A plurality of devices may communicate with the one or more servers. Such communications may be serial and/or simultaneous. The server may be a merchant server. The server may be owned and/or operated by the merchant.

The programmable processor of the server may execute one or more steps as provided therein. Any actions or steps described herein may be performed with the aid of a programmable processor. Human intervention may not be required in automated steps. The programmable processor may be useful for analyzing user input and/or managing transaction and/or device information. The server may also include memory comprising non-transitory computer readable media with code, logic, instructions for executing one or more of the steps provided herein.

The server may have a clock or other timekeeping device. The server clock may indicate a time for the server, which may or may not correspond to an objective time for the location of the server. The server clock may or may not be synchronized with other clocks.

The device 210a, 210b, 210c may communicate with the server 230 via a network 220, such as a wide area network (e.g., the Internet), a local area network, or telecommunications network (e.g., cellular phone network or data network). The device and/or server may have a wired or wireless transceiver and/or assembly that may expedite communications over the network. Communication may also be intermediated by a third party.

In one example, a user may be interacting with the server via an application or website. For example, the user may be viewing and/or purchasing items, via the user's device. A user interface may be provided via a display of the user's device. The user may provide personal information about the user. The user may provide the user's credit card information. Information about the user, transaction, and/or device may be collected (e.g. on the browser side or through an application on the device). The information may be collected and provided to the server. The server may or may not perform analysis of the collected information and/or provide additional calculations. For example, the server may calculate a difference in time between the device clock and the server clock. Information collected and provided to the server may include a timestamp from the device, which may be compared with a timestamp from the server. The difference in time may be a parameter that may be shared with one or more additional data repositories. The server may communicate with one or more additional entity servers or repositories over a network, such as networks described elsewhere herein.

FIG. 3 shows an example of a derivative locator used to access information a repository. A current transaction (e.g., transaction N) may be underway and pending approval of a checkout. A derivative record locator may be derived from information accessible to one or more financial party. Such information may include financial transaction information that is provided to the financial parties within the normal pipeline of a transaction. In one example, a derivative record locator (N) may be formed based on the credit card number and transaction amount for the current transaction. The derivative locator may be any form of locator that is derived from the credit card number and transaction amount. Additional information may or may not be included in forming the derivative locator. In one example, the credit card number and transaction amount may be appended together. For example, if the credit card number is: 1234567812345678, and the transaction amount is $79.18, the derivative locator may be 1234567812345678.18 or 79.181234567812345678, or a hashed value of the credit card ABCDE12345 and 79.18, or any other combination thereof. In other examples, one or more calculation may be performed. A hash string may be generated using the credit card number and transaction amount or other factors. A mathematical calculation may be performed using the credit card number and transaction amount or other factors. Alphanumeric or other representations of the credit card number and transaction amount or other factors may be provided. The derivative locator may be stored in a memory of the repository. The derivative locator may be stored in the memory and associated with or linked to related records in the repository.

Any description herein of a credit card may also apply to debit cards, pre-paid cards, gift cards, routing numbers, or any other financial identifier. For example, the derivative locator may be formulated based on a debit card number and transaction amount.

A timestamp (N) may be made when attempting to find a record in the repository. The timestamp may be taken when formulating the derivative locator. The timestamp may be indicative of a time of a requesting party (e.g., issuing bank, global financial network, or acquiring bank) clock, repository clock, or merchant clock. The timestamp (N) of the current transaction may be indicative of the time at which the repository is being accessed.

A repository may include information from one or more merchants relating to one or more transactions. The repository may include information from other data sources. The repository may include information from the current transaction (N). The information from the current transaction (N) may have been provided by the merchant in the current transaction. The information from the current transaction may be associated with or combined with other information already in the repository. One or more common hook may be provided between the associated information. For example, the repository may include information about the device used in the current transaction. Other information relating to the same device (or a device identified as likely being the same device) from other transactions (e.g., with the same or different merchants) may also be associated with the current transaction information. In another example, the repository may include information about the credit card used in the current transaction. Other information relating to the same credit card from other transactions (e.g., with the same or different merchants, with the same or different device) may be associated with the current transaction information. Alternatively, the transaction information may be standalone and need not be associated with other information outside the various transactions.

In some embodiments, a device locator may be generated each time a transaction is initiated and information is sent to the repository. For example, for a transaction 1, a derivative locator (DL1) may be generated and stored in the repository. A corresponding timestamp (T1) may be stored in the repository. Associated transaction information (e.g., information relating to the user, device, credit card, financials, transaction specifics) may be stored in the repository and may be associated with the derivative locator (DL1) and corresponding timestamp (T1). For other transactions (e.g., transaction 2), its own derivative locator (DL2) and associated timestamp (T2) may be stored in the repository. Information associated with the transaction (e.g., transaction 2) may be associated with its derivative locator (DL2) and timestamp (T2). Associated derivate locators and/or timestamps may be associated with each of the transaction records in the repository. The derivative locators may form a searchable field or index through which to access associated transaction information from the repository.

In the current transaction (N), a derivative locator (DLN) may be formulated based on information available to the party requesting information from the repository. The derivative locator (DLN) may be compared with one or more derivative locators in the repository (DL1, DL2, DL3, . . . ). When a match is found, the associated information may be accessed by the requesting party.

In some embodiments, one or more timestamp may be utilized before providing information to the requesting party. In one example, the derivative locators may be relatively unique, but may not be completely unique. For instance, the derivative locators may be a combination of a credit card number and transaction amount. It is possible that the same credit card was used in multiple transactions that have the same transaction amounts (e.g., for credit card 1234567812345678, two purchases for $79.18 were made, one in the current transaction and one last month).

In order to ensure access to the correct current transaction information in the repository, timestamps may be compared. The difference between the timestamp when requesting the repository information (e.g., TN) and the timestamp stored in the repository for the corresponding derivative locator may be calculated (e.g., if DL4 corresponds to DLN, the difference between T4 and TN may be determined). If the difference in the timestamps does not exceed a time threshold value, then the record with the corresponding derivative locator may be determined to be the record for the transaction and may be accessed by or sent to the requesting party. If the difference in timestamps does exceed the time threshold value, then the transaction in the repository likely refers to a separate transaction, and this transaction information is not accessed. For example, the transfer of information within the system (e.g., between the merchant, acquiring bank, global financial network, and/or issuing bank) may occur rapidly. The transfer of information may occur in an automated fashion with aid of a processor, without requiring human intervention. The time threshold value may be greater than the anticipated time for information to travel from the merchant to the requesting party. For example, the time threshold value may be on the order of tens of seconds or less, or seconds or less. For example, if the derivative locators match, and the timestamp in the repository indicates that transaction record was created at 01:00:01.00, and the timestamp with the request indicates that the current time is 01:00:01.10, then it is likely that the record in the repository belongs to the current transaction.

The time threshold value may be predetermined and/or preset. Alternatively, the time threshold value may vary in response to one or more input. The time threshold may be dictated by the repository system. Alternatively, the time threshold value may be determined per requesting party (e.g., issuing bank, global financial network, acquiring bank).

Figure 4:
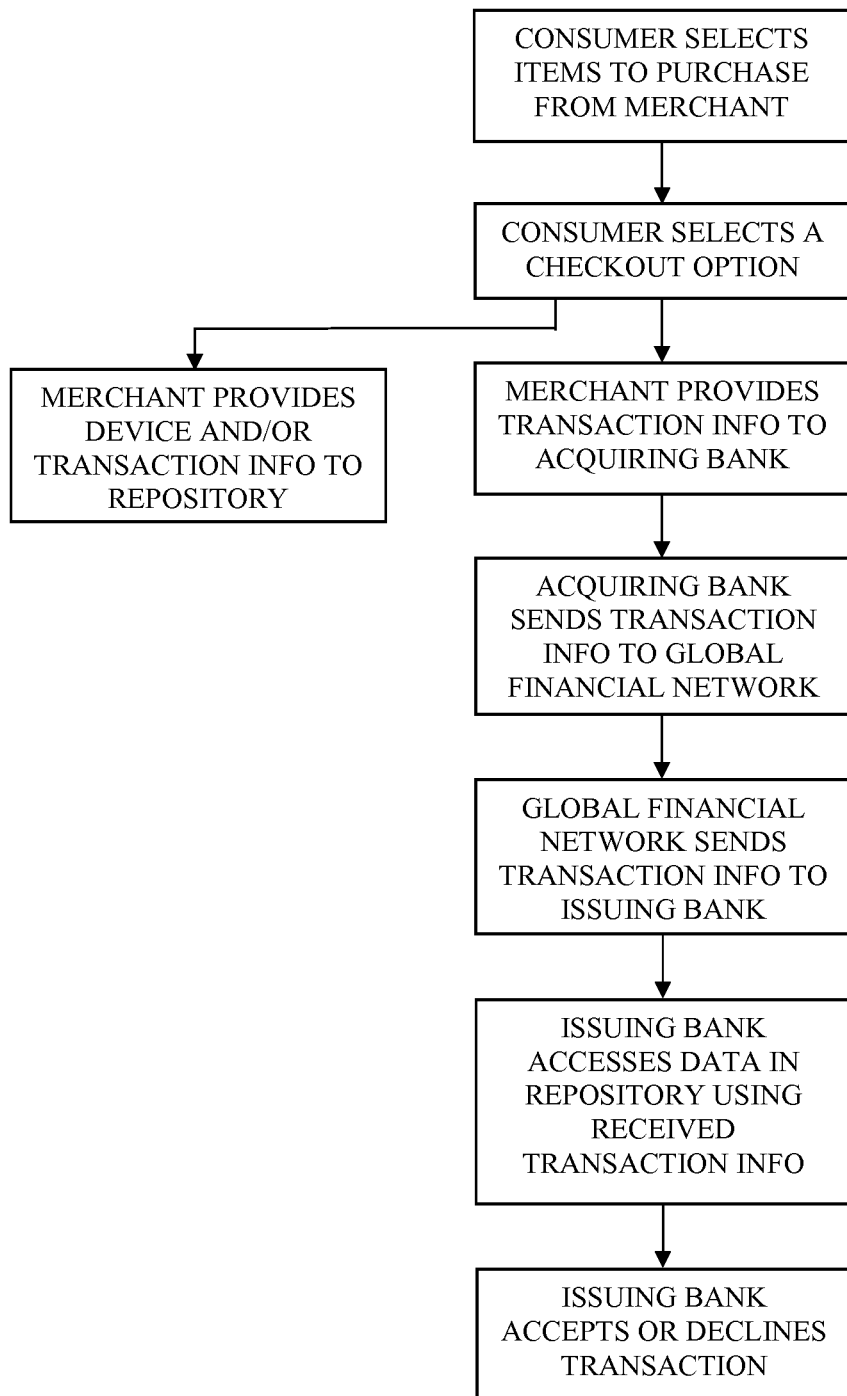
FIG. 4 shows an example of a commercial transaction process in accordance with an embodiment of the invention.

FIG. 4 shows an example of a commercial transaction process in accordance with an embodiment of the invention. One or more of the following steps may occur in the order presented, or in alternative orders. One or more of the steps may be optional. One or more additional steps may be provided or may be used in alternative to any of the steps described.

A consumer may select one or more item to purchase from a merchant. The consumer may be at the merchant website or application. The consumer may be accessing the merchant website or application using a device. The consumer may have filled up a virtual shopping bag with one or more items of goods or services. The items listed in the virtual shopping bag may be representative of physical goods or real-life services to be performed. Consumer financial information (e.g., consumer credit card information) may be entered by the consumer or may be pre-stored on the consumer's merchant account.

The consumer may select a checkout option. Once the consumer has selected the checkout option, the consumer may await confirmation or denial of the transaction. The entire confirmation or denial process may optionally occur in a rapid fashion. The confirmation or denial process may occur automatically with aid of one or more processors, and may or may not require human intervention. One or more of the steps described herein may be performed with aid of a programmable processor. In some instances, the entire process may take a few minutes or less, one minute or less, 30 seconds or less, 15 seconds or less, 10 seconds or less, 5 seconds or less, 3 seconds or less, 2 seconds or less, or 1 second or less.

When a consumer has selected a checkout option, the merchant may provide information to a central repository. The provided information may include information about the user (e.g., user name, address, contact information, date of birth, etc.), information specific to the transaction (e.g., transaction amount, items purchased in the transaction, fees, shipping, address, breakdown, taxes, promotions/discounts), and/or information about the device (e.g., device timestamp information, device time zone, IP address, other device configurations). The merchant may or may not perform any calculations from the merchant end (e.g., calculating a time difference parameter between based on time differences between the consumer device and a merchant server or other reference clock). The merchant may optionally provide information from the merchant server that may be used by the repository or other entity for analysis (e.g., sending merchant server clock time, and having the repository or requesting party calculate the difference between the device clock time and server or other reference clock time). The information provided to the repository may be useful in determining the likelihood of a fraudulent transaction and/or determining the reputation of the device or user. One or more discrepancies may be inherent within the transaction information (e.g., the device may be in a first time zone, while the credit card is addressed to an individual living in a different time zone). Optionally, transaction records within the repository may be linked or compared, or incorporated into one another (e.g., it may be noted that a particular credit card is typically associated with a particular device, device information may be compared to determine if different transactions occurred using the same device, user information may be compared to determine if different transactions were performed by the same user, or any combination thereof). Information within the central repository may be provided by the merchant in the current transaction. The repository may also include information from other merchants and/or from other transactions. The repository may also include information provided by other data sources. The repository may be updated in real-time. In some instances, the repository may provide an indication of a likelihood of fraud for a transaction, device, and/or user. This may incorporate the real-time information collected from one or more sources. The repository may provide reputation information for a device and/or user. The reputation information may incorporate the real-time information collected from one or more sources. The reputation information and/or fraud information may be determined separately or based on one another, and may optionally be provided in conjunction.

When a consumer has selected a checkout option, the merchant may provide information about the transaction to an acquiring bank. The merchant may provide information to the acquiring bank subsequent to, prior to, or concurrently with providing information to the repository. In some instances, it may be desirable to provide information to the repository first in order to ensure that the information is already in the repository if the acquiring bank decides to request information from the repository. Information may be provided to the acquiring bank in the usual process of confirming financial transaction information. Such information may include but is not limited to credit card number, name on the credit card, credit card expiration date, or transaction amount.

The acquiring bank may send transaction information to a global financial network. This may occur subsequent to the acquiring bank receiving transaction information from the merchant. Information may be provided to the global financial network in the usual process of confirming financial transaction information. Such information may include but is not limited to credit card number, name on the credit card, credit card expiration date, or transaction amount.

The global financial network may send transaction information to an issuing bank. This may occur subsequent to the global financial network receiving transaction information from the acquiring bank. Information may be provided to the issuing bank in the usual process of confirming financial transaction information. Such information may include but is not limited to credit card number, name on the credit card, credit card expiration date, or transaction amount.

The issuing bank may access data in the repository using the received transaction information. For example, at least a portion of the received transaction information may be used to formulate a derivative locator for accessing the records. For example, the received transaction information may include a credit card number and transaction amount (e.g., dollar amount or other currency amount). A derivative record locator may be formulated from the information. The derivative locator may match one or more derivative locators stored in the repository as indices to one or more records. A request timestamp may be generated when the issuing bank formulates the derivative locator and/or requests information from the repository. The records in the repository may include one or more stored timestamps indicative of when information was provided to the repository. The request timestamp may be compared with the stored timestamp. If not too much time has elapsed between the stored timestamp and the request timestamp, the corresponding records with matching derivative locators are determined to belong to the current (open, pending) transaction. The issuing bank may access the records in the repository associated with the matching derivative locators that fall within the acceptable time threshold. The repository may provide the issuing bank with any transaction-related information and/or information about the device and/or user. Linked and/or analyzed information from the repository, such as fraud or reputation information may be provided.

The issuing bank may accept or decline the transaction. The issuing bank may make a determination to accept or decline based on the information accessed from the repository. For example, the repository may include information that may assist with the determination of whether the transaction is likely to be fraudulent or not, or provide a reputation of the user and/or device. For example, the repository may include one or more "red flag" that may be indicative of low reputation, suspicious behavior or likely fraudulent transaction. This "red flag" information may be conveyed to the issuing bank. The issuing bank may or may not perform analytics of the information from the repository to determine whether a "red flag" is present. Such analysis may occur with aid of a programmable processor. If no red flags are detected, the issuing bank may decide to accept the transaction. The issuing bank may make notification of the acceptance of the transaction to the global financial network, which may convey the acceptance to the acquiring bank, which may convey acceptance to the merchant. The merchant may then close the transaction and indicate to the consumer that the transaction has been accepted. If one or more red flags may be detected, the issuing bank may determine whether the risk of fraudulent transaction is acceptable or not. If the risk is low enough to be acceptable, the transaction may be accepted, and parties may be notified accordingly. If the level of risk is too high, the issuing bank may decline the transaction and may inform the respective parties accordingly. The merchant may be informed that the transaction is denied. The merchant may inform the consumer that the transaction is denied.

The issuing bank is provided as an example of a requesting party of information from the repository. In other embodiments, the acquiring bank and/or the global financial network may request information from the repository. Similar techniques may be utilized. For example, the acquiring bank and/or global financial network may formulate a derivate locator based on received transaction information. The acquiring bank and/or global financial network may have a request timestamp. The timestamp may be compared with timestamps in the data repository, and the derivative locators may be compared with derivate locators in the repository. Corresponding information for the current (e.g., open, pending) transaction may be provided to the requesting party (e.g., acquiring bank and/or global financial network). Other related information from the repository (e.g., relating to the transaction, device, user, likelihood of fraud, reputation) may be provided to the requesting party. The requesting party may receive or analyze the information to determine whether to accept or decline the transaction. The transaction may be accepted or declined at any point along the process. The respective parties may be notified. In some instances, for a transaction to be completed and accepted, all parties (e.g., acquiring bank, global financial network, and issuing bank) may accept the transaction. A decline of the transaction at any point in the process may result in the entire transaction being declined.

Any of the steps described herein may be performed with the aid of a processor. In some instances, one or more of the steps may occur automatically without requiring human interaction. One or more computations or steps described herein may be performed in response to non-transitory computer readable media with code, logic, or instructions for performing the one or more steps.

FIG. 5 provides an example of a repository that may be in communication with multiple entities. As previously described one or more sources may provide information to a repository 520, which may include one or more merchant 510a, 510b, 510c, one or more devices, one or more financial entity, or other sources. Information from the repository may accessed by one or more querying party, which may include financial entities 560a, 560b, 560c (e.g., issuing bank, acquiring bank, global financial networks) or any other entities (e.g., merchants, user devices).

Information may be provided by one or more multiple sources and collected within the repository. The information may be aggregated and/or analyzed at the repository. Information from various transactions or sources relating to the devices that are likely to be the same device, and/or users likely to be the same user may be linked or associated with one another. In some instances, a reputation score may be determined and/or associated with the respective transactions, devices, and/or user records. The repository may take advantage of information from various sources and bring them together to provide an comprehensive and up-to-date analysis.

One or more sources may provide information to a repository. The one or more sources may or may not access information from the repository. In some instances, an entity may provide information to the repository without accessing or using information from the repository, may access or use information from the repository without providing information to the repository, or may both provide information to the repository and access or use information from the repository. The one or more sources may be owned and/or operated by different entities, such as companies or subsidiaries thereof. In some examples, various merchants may provide information to the repository from various merchant transactions and may use the information from the repository. Thus, merchants communicating with the repository may share information with one another via the repository. Similarly, various banks, global financial networks, or other financial entities may provide information to the repository and may use information from the repository. The financial entities may provide information relating to a user's financials, merchant's financials, or any transactions. Thus, the financial entities communicating with the repository may share information with one another via the repository. The merchants and financial entities may share information with one another, and optionally additional entities, via the repository.

The systems and methods described herein may advantageously permit the access of information that may assist with the determination of whether a financial transaction may be fraudulent or not. The repository may serve as a central data repository where information may be gathered across multiple transaction (e.g., across one or multiple merchants). This may permit the sharing of data which may reveal patterns or indicators of fraud or suspicious behavior. The sharing of data may also assist with formulating a reputation for devices and/or users over time. The reputation may be based on device information without being based on user information, user information without being based on device information, or based on both device and user information. Optionally, the reputation may be determined without requiring the use of a user's personal information.

The sharing of data may permit a device and/or user's reputation to follow him or her to an interaction with a new entity, such as a new merchant. Thus, even if it is a user or device's first time interacting with a merchant, the user may have a positive, negative, or neutral reputation based on the shared data. In some instances, the shared data may include a reputation indicator, such as a score. The reputation of a user and/or device may be indicative of a risk associated with interacting with the user and/or device. In some instances, negative reputations may be relevant for determining a likelihood of fraud.

Positive reputations may be useful for verifying or authenticating an individual or device. In some instances, positive reputation scores may be useful for identifying good users or devices, which may afford specialized status or treatment. In some instances, positive reputations may result in confirmation of a transaction with fewer checks or delay. In some instances, a positive reputation may enable a user to be approved for a transaction with fewer checks or delay, even if it is the first time or one of the first times that a user is interacting with a particular party (e.g., merchant). This may save efforts on the merchant side to verify the user and permit the merchant to allocate efforts elsewhere. This may also save time for the user, and permit rapid verification and/or approval for transactions. Having a positive reputation may enable a user to go through and participate in a transaction during a denial of service attack. Other examples of specialized status or treatments may include the offer of discounts, cash, rewards, coupons, free shipping, no or less wait-time, special access, higher level of service, or any other type of specialized treatment. Having a positive reputation may enable the user to received the specialized status or treatment without any or with very little investigation from the merchant, by leveraging historical information about the user and/or device collected from various merchants.

Good or bad reputation information may be useful when a user is opening an account, logging into an account (e.g., being authenticated), or is a new or repeat buyer (e.g., undertaking a transaction). Historical reputation information from a data repository can be used to approve or not approve a transaction. This may advantageously permit increased sales and approval rates for the entire system, and increase customer satisfaction. More transactions may be approved through the use of repository data. This may also decrease fraud losses over the system, and decrease operational costs.

Longitudinal data collected over time may be useful for the determination of fraud or reputation. The repository may include information relating to the consumer's device used in the transaction. The device information may be useful for assessing a risk of fraud or determining a reputation.

In typical financial transactions, certain information may be conveyed between parties (e.g., merchant, acquiring bank-such as merchant bank; global financial network—such as Visa, Mastercard, Amex, Diners, or others; and issuing bank-such as consumer's credit card bank). The information provided within the normal pipeline for financial transactions may include the consumer's credit card and transaction information. It may be desirable for the parties to access additional information about the transaction, device, and/or user which may be useful for the parties to assess risk of fraud prior to accepting or declining the financial transaction. However, it may not be desirable to alter the existing information pipeline between the parties. Thus, informational infrastructure challenges may be presented if the additional information (such as device information, or a foreign key index to records in the repository) was conveyed by the merchant to the other parties. This may require restructuring of data storage systems in various parties. Systems and methods provided herein permits a data repository to aggregate and/or analyze information provided from one or more sources, which may be accessible by various querying parties without altering the existing information pipeline between the parties. A likelihood of fraud and/or reputation can be determined and take full advantage of the aggregated information without having to alter the existing information pipeline.

Thus, the system provided herein may advantageously permit the use of the existing data pipelines, but permit the requesting parties to access additional information (e.g., provided in an repository) that may assist with determination of whether there is a fraudulent transaction. The existing data may be used to formulate the record locator which can be used to access the additional information.

Figure 6:
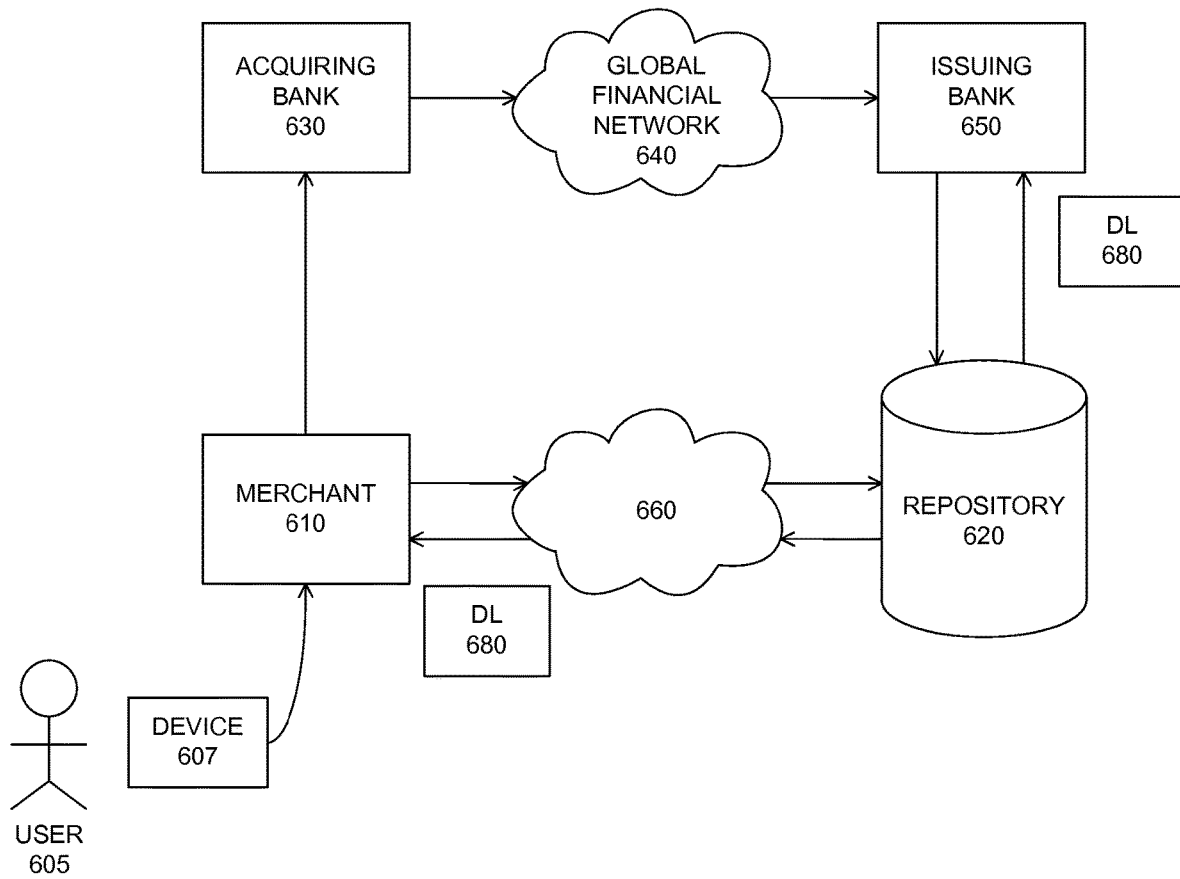
FIG. 6 shows an example of a records access system utilizing a repository in accordance with another aspect of the invention.

FIG. 6 provides an additional illustration of a records access system utilizing a repository in accordance with an embodiment of the invention. A user 605 may use a device 607 to interact with a merchant 610. The user may use the device to facilitate a transaction with the merchant. The transaction may be a financial transaction. In some instances, the user device may have a processor, a memory, and a user interface through which the user may interact with the device. The user device may have a communication assembly through which the device may communicate with a device of the merchant, e.g., merchant sever.

In one example, a user 605 may provide the user's credit card (or debit card, gift card, or other financial payment) information to the merchant through the device 607. The user may select a submit option to open the transaction. The transaction may remain open until it is approved by the user's issuing bank. The merchant 610 may send information about the transaction to an acquiring bank 630. The acquiring bank may have a device (e.g., server, databases) having a processor and memory. The memory may store information about the merchant's financial records. The acquiring bank may send information about the transaction to a global financial network 640. The global financial network may have a device (e.g., server, databases) having a processor and memory. The global financial network may send information about the transaction to an issuing bank 650. The issuing bank may have a device (e.g., server, databases) having a processor and memory. The memory may store information about the user's financial records.

In some instances, a derivative locator 680 may be formulated based on the transaction information. The derivative locator may be formed by the merchant, repository, acquiring bank, global financial network, issuing bank, user device, or any other entity. The derivative locator may be formulated based on the transaction information that is passed on to the acquiring bank, global financial network, and/or issuing bank. The derivative locator may be formulated by accessing memory storage units of the merchant, repository, acquiring bank, global financial network, issuing bank, user device, or any other entity. The derivative locator may be formulated with aid of a processor of the merchant, repository, acquiring bank, global financial network, issuing bank, user device, or any other entity. Examples of derivative locators are provided elsewhere herein.

A repository 620 is provided through which a merchant 610 may communicate. Two-way communication may be provided between the repository and the merchant. In some instances, communication between a merchant and repository may occur over a network 660, which as a local area network, wide area network (e.g., Internet), telecommunications network, cellular network, data network, or any other type of network. Alternatively such communications may occur directly. One or more merchants may be capable of communicating with the repository over the network. The one or more merchants may communicate with the repository simultaneously. A derivative locator 680 may be used during locations between the merchant and the repository. The merchant may use the derivative locator to access records in the repository. The derivative locator may serve as an index of records in the repository.

In some instances, the merchant 610 may provide information to the repository 620. The merchant may provide information about the user 605, user device 607, and/or transaction. In some instances, the merchant may provide information about whether a transaction was approved or not approved. The merchant may provide information about whether a transaction went through smoothly or whether any red flags occurred during or after the transaction. In some instances, the information from the merchant may be coupled with a derivative locator when sent to the repository. The derivative locator may be formulated by the merchant. Alternatively, information may be sent to the repository, and the derivative locator may be formulated at the repository using the information from the merchant.

In some embodiments an issuing bank 650 may communicate with the repository 620. Two-way communication may be provided between the issuing bank and the repository. In some instances, communication between the issuing bank and the repository may occur over a network, or may occur directly. One or more banks or other financial entities may be capable of communicating with the repository over the network. The one or more banks or other financial entities may communicate with the repository simultaneously. A derivative locator 680 may be used during locations between the bank and the repository. The bank may use the derivative locator to access records in the repository. The derivative locator may serve as an index of records in the repository. In some examples, an issuing bank may formulate a derivative locator based on information passed from the merchant through the acquiring bank and global financial network.

In some instances, the issuing bank 650, acquiring bank, global financial network, or any other type of entity may provide information to the repository 620. The bank or any other financial entity may provide information about the user 605, user device 607, the user's finances, and/or transaction. In some instances, the bank may provide information about whether a transaction was approved or not approved. The bank may provide information about whether an approval went through smoothly or whether any red flags occurred during or after the transaction. In some instances, the information from the bank may be coupled with a derivative locator when sent to the repository. The derivative locator may be formulated by the bank. The derivative locator may be formulated based on transaction information passed from the merchant to the bank through any intervening entities. Alternatively, information may be sent to the repository, and the derivative locator may be formulated at the repository using the information from the bank.

The derivative locator may be formulated by any entity along the transaction and/or transaction approval process. The derivative locator may be formulated based on information accessible by any entity along the transaction approval process. Information accessible by the entities along the transaction approval process may be used to formulate the derivative locator at the repository.

Any entity accessing the repository may access information provided to the repository by any other entity. Access and/or storage of information may be governed by a derivative locator which may be formulated on information that is accessible to the entities. In some instances, all entities of the system may have access to the information used to formulate the derivative locator. In some instances, the user device, merchant, acquiring bank, global financial network, and/or issuing bank may receive or have access to the information used to formulate the derivative locator. The information stored in the repository may be useful to determine whether to approve a transaction between a user device and a merchant. The information stored in the repository may be useful to determine whether to approve a transaction between a user and any entity that may have access to the repository. The information stored in the repository may include reputation information for the user and/or user device.

Any of the entities described herein may have a clock or other time-keeping device. For example a user device may have a local device clock, a merchant may have a merchant server clock, an acquiring bank may have an acquiring bank server clock, a global financial network may have a global financial network server clock, and/or an issuing bank may have an issuing bank server clock. The repository may or may not have a repository clock. Times from the clocks may be useful to access records within the repository. In some instances, a combination of the derivative locator and time information (e.g., based on one or more clocks) may be useful for accessing records within the repository.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A method of providing a fraud indication, the method comprising:
   determining, by a computer processor associated with a fraud detection server, a first derivative locator based at least in part on first transaction information associated with a first transaction;
   based at least on a comparison of the first derivative locator that is linked to a first transaction record with a plurality of derivative locators that are linked to a plurality of transaction records, determining, by the computer processor, that the plurality of derivative locators includes the first derivative locator;
   in response to the determination that the plurality of derivative locators includes the first derivative locator, accessing electronic records corresponding to the first derivative locator, wherein the electronic records comprise a reputation score that is generated using aggregated device information or aggregated user information, and wherein the reputation score indicates a likelihood that the first derivative locator is associated with a fraudulent transaction; and
   transmitting, by the computer processor and to a remote financial server, the first transaction record and the reputation score.

2. The method of claim 1 wherein the first derivative locator is formulated based on a credit card number used in the first transaction and a transaction amount from the first transaction.

3. The method of claim 1 wherein the first derivative locator includes only transaction information for the first transaction that is transmitted to an issuing bank.

4. The method of claim 1 further comprising capturing a request timestamp; and
   comparing, with aid of a processor, the request timestamp with a stored timestamp in a repository corresponding to index information that is associated with the first derivative locator.

5. The method of claim 4 further comprising assessing a likelihood of fraud if a difference in time between the request timestamp and the stored timestamp exceeds a predetermined time threshold.

6. The method of claim 1 further comprising assessing a likelihood of fraud based on the plurality of transaction records.

7. The method of claim 5, wherein the first transaction is not completed if the likelihood of fraud exceeds a predetermined level, and wherein the first transaction is completed if the likelihood of fraud is below the predetermined level.

8. The method of claim 1 further comprising providing at least some of the first transaction information to a repository, and storing the first transaction information as records within the repository.

9. A system for providing a fraud indication, the system comprising:
   a fraud detection server configured to establish a connection with a plurality of network servers over a network, the plurality of network servers comprising a transaction processing computing server and a remote financial server;
   a data store configured to store computer-executable instructions; and
   a processor in communication with the data store, the processor, when executing the computer-executable instructions, configured to:
      determine, by a computer processor associated with a fraud detection server, a first derivative locator based at least in part on first transaction information associated with a first transaction;
      based at least on a comparison of the first derivative locator that is linked to a first transaction record with a plurality of derivative locators that are linked to a plurality of transaction records, determine, by the computer processor, that the plurality of derivative locators includes the first derivative locator;
      in response to the determination that the plurality of derivative locators includes the first derivative locator, access electronic records corresponding to the first derivative locator, wherein the electronic records comprise a reputation score that is generated using aggregated device information or aggregated user information, and wherein the reputation score indicates a likelihood that the first derivative locator is associated with a fraudulent transaction; and transmit, by the computer processor and to a remote financial server, the first transaction record and the reputation score.

10. The system of claim 9 wherein the first derivative locator is formulated based on credit card number, debit card number, or pre-paid card number used in the first transaction and a currency amount from the first transaction.

11. The system of claim 9 wherein a repository stores the first transaction information as records.

12. The system of claim 11 wherein the repository includes a reputation score for a user device formulated based on previous transactions associated with the user device.

13. The system of claim 12 further comprising a processor that compares the reputation score with a predetermined threshold, and determines whether to approve the first transaction based on whether the reputation score exceeds the predetermined threshold.

14. A non-transitory computer storage having stored thereon a computer program, the computer program comprising executable instructions that instruct a computer processor of a fraud detection server to at least:

determine, by a computer processor associated with a fraud detection server, a first derivative locator based at least in part on first transaction information associated with a first transaction;

based at least on a comparison of the first derivative locator that is linked to a first transaction record with a plurality of derivative locators that are linked to a plurality of transaction records, determine, by the computer processor, that the plurality of derivative locators includes the first derivative locator;

in response to the determination that the plurality of derivative locators includes the first derivative locator, access electronic records corresponding to the first derivative locator, wherein the electronic records comprise a reputation score that is generated using aggregated device information or aggregated user information, and wherein the reputation score indicates a likelihood that the first derivative locator is associated with a fraudulent transaction; and transmit, by the computer processor and to a remote financial server, the first transaction record and the reputation score.

15. The non-transitory computer storage of claim 14, wherein the first derivative locator is determined based on: a credit card number used in the first transaction, a transaction amount from the first transaction, or both.

16. The non-transitory computer storage of claim 14, wherein the aggregated device information or aggregated user information is aggregated from one or more financial institutions.

17. The non-transitory computer storage of claim 14, wherein the computer processor is further configured to:

based at least in part on a comparison of the reputation score to a threshold score, rate and transmit, by the computer processor and to a remote financial server, instructions configured to cancel the first transaction.

18. The non-transitory computer storage of claim 14, wherein the computer processor is further configured to:

provide at least some of the first transaction information to a repository; and update the reputation score based on at least some of the first transaction information.

19. The non-transitory computer storage of claim 14, wherein the first transaction is an online transaction.

* * * * *